(12) United States Patent
Ishibashi et al.

(10) Patent No.: US 10,596,961 B2
(45) Date of Patent: Mar. 24, 2020

(54) VEHICULAR INTERIOR LIGHTING DEVICE AND ROOF MODULE

(71) Applicant: Yazaki Corporation, Tokyo (JP)

(72) Inventors: Shuichi Ishibashi, Shizuoka (JP); Mitsuhiro Sugimori, Shimada (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/516,385

(22) Filed: Jul. 19, 2019

(65) Prior Publication Data
US 2020/0062176 A1   Feb. 27, 2020

(30) Foreign Application Priority Data

Aug. 22, 2018   (JP) .................................. 2018-155560

(51) Int. Cl.
| | |
|---|---|
| *B60Q 3/62* | (2017.01) |
| *B60Q 3/20* | (2017.01) |
| *F21V 5/00* | (2018.01) |
| *B60Q 3/74* | (2017.01) |
| *F21Y 115/10* | (2016.01) |

(52) U.S. Cl.
CPC ................ *B60Q 3/62* (2017.02); *B60Q 3/20* (2017.02); *B60Q 3/74* (2017.02); *F21V 5/004* (2013.01); *F21Y 2115/10* (2016.08)

(58) Field of Classification Search
CPC ............... B60Q 3/62; B60Q 3/74; B60Q 3/76
See application file for complete search history.

(56) References Cited

U.S. PATENT DOCUMENTS

| | | | | |
|---|---|---|---|---|
| 2003/0063468 A1* | 4/2003 | Kobayashi | ............. | B60K 37/06 362/326 |
| 2005/0286262 A1* | 12/2005 | Gasquet | ............... | G02B 6/0018 362/555 |
| 2009/0262548 A1 | 10/2009 | Ando | | |
| 2016/0121789 A1* | 5/2016 | Moon | ...................... | B60Q 3/82 362/514 |
| 2018/0118103 A1* | 5/2018 | Sato | ......................... | B60Q 3/76 |

FOREIGN PATENT DOCUMENTS

| | | | | |
|---|---|---|---|---|
| DE | 19654358 A1 * | 6/1998 | .......... | G02B 6/0036 |
| JP | 2009-255709 A | 11/2009 | | |

* cited by examiner

*Primary Examiner* — Alexander K Garlen
(74) *Attorney, Agent, or Firm* — Sughrue Mion, PLLC

(57) ABSTRACT

A vehicular interior lighting device includes a main body portion fixed to a roof, a first light source and a second light source accommodated in the main body portion, a light shielding cover portion covering the first and second light sources from below, a light guide member having a protruding portion protruding along the inside surface from a gap between the main body portion and the cover portion, and a condensing lens disposed between the second light source and the light guide member. The light guide member has a diffusion portion formed on a surface of the protruding portion facing downward and a reflecting portion reflecting light emitted from the second light source toward a part of the diffusion portion. The diffusion portion emits light in whole by light emitted from the first light source and partially emits light by light emitted from the second light source.

5 Claims, 15 Drawing Sheets

VEHICULAR INTERIOR LIGHTING DEVICE AND ROOF MODULE

CROSS-REFERENCE TO RELATED APPLICATION(S)

The present application claims priority to and incorporates by reference the entire contents of Japanese Patent Application No. 2018-155560 filed in Japan on Aug. 22, 2018.

BACKGROUND OF THE INVENTION

1. Field of the Invention

The present invention relates to a vehicular interior lighting device and a roof module.

2. Description of the Related Art

Interior lighting devices for vehicles are known in the related art. Japanese Patent Application Laid-open No. 2009-255709 discloses a technique for a cabin lighting device provided with a case to which a bulb as a light source is attached, a design panel provided on the side of the case that is in a cabin, and an illumination lens attached so as to be substantially flush with the surface of the design panel and transmitting the light from the light source. The light source is behind the illumination lens, and thus a passenger can view the light source in this configuration.

It is desirable to be capable of realizing novel lighting in vehicles. For example, a user can feel novelty once it becomes possible to realize a visual effect as if light is afloat in the air.

SUMMARY OF THE INVENTION

An object of the present invention is to provide a vehicular interior lighting device and a roof module that are capable of realizing lighting providing a feeling of novelty.

In order to achieve the above mentioned object, a vehicular interior lighting device according to one aspect of the present invention includes a main body portion fixed to an inside surface, the inside surface being a cabin side surface of a roof of a vehicle; a first light source and a second light source accommodated in the main body portion; a light shielding cover portion constituting a housing with the main body portion and covering the first light source and the second light source from below; a light guide member having a protruding portion protruding toward a direction along the inside surface from a gap between the main body portion and the cover portion and guiding light emitted from the first light source and the second light source to a cabin; and a condensing lens disposed between the second light source and the light guide member, wherein the light guide member has a diffusion portion formed on a surface of the protruding portion facing downward and diffusing light and a reflecting portion reflecting light emitted from the second light source and incident on the light guide member via the condensing lens toward a part of the diffusion portion, and the diffusion portion of the light guide member emits light in whole by light emitted from the first light source and a part of the diffusion portion emits light by light emitted from the second light source.

According to another aspect of the present invention, in the vehicular interior lighting device, it is preferable that the protruding portion has a first protruding portion protruding toward one side in a vehicle width direction, a second protruding portion protruding toward another side in a vehicle width direction, and a third protruding portion protruding toward a rear of a vehicle, and light emitted from the second light source causes an intersection of the first protruding portion and the third protruding portion in the diffusion portion and an intersection of the second protruding portion and the third protruding portion in the diffusion portion to emit light.

According to still another aspect of the present invention, in the vehicular interior lighting device, it is preferable that a circular region in the diffusion portion emits light by light emitted from the second light source.

In order to achieve the above mentioned object, a roof module according to still another aspect of the present invention includes a main body portion fixed to an inside surface, the inside surface being a cabin side surface of a roof of a vehicle; a first light source and a second light source accommodated in the main body portion; a light shielding cover portion constituting a housing with the main body portion, having a concave portion concave upward, and covering the first light source and the second light source from below; a light guide member having a protruding portion protruding toward a direction along the inside surface from a gap between the main body portion and the cover portion and guiding light emitted from the first light source and the second light source to a cabin; a condensing lens disposed between the second light source and the light guide member; and a display device disposed in the concave portion and having a display surface directed to a rear of a vehicle, wherein the light guide member has a diffusion portion formed on a surface of the protruding portion facing downward and diffusing light and a reflecting portion reflecting light emitted from the second light source and incident on the light guide member via the condensing lens toward a part of the diffusion portion, and the diffusion portion of the light guide member emits light in whole by light emitted from the first light source and a part of the diffusion portion emits light by light emitted from the second light source.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicular interior lighting device and a roof module according to an embodiment of the present invention will be described in detail below with reference to accompanying drawings. The present invention is not limited by the embodiment. Constituent elements in the following embodiment include those easily conceivable by those skilled in the art or those substantially identical.

Embodiment

Figure 1:
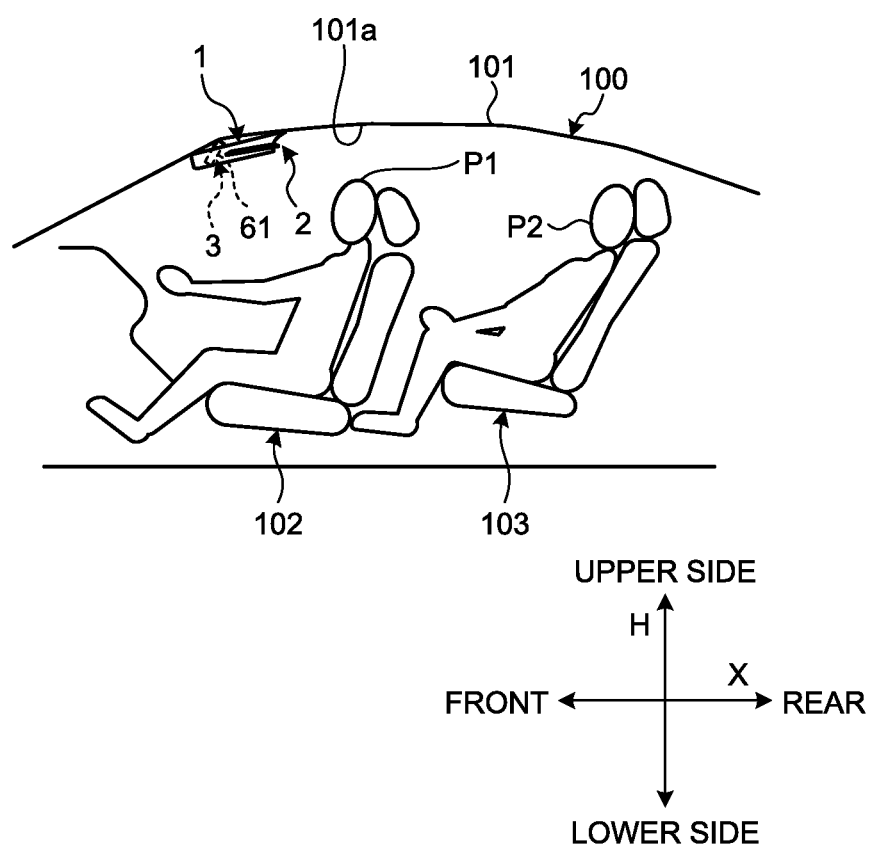
FIG. 1 is a diagram illustrating the disposition of a roof module according to an embodiment.
Figure 2:
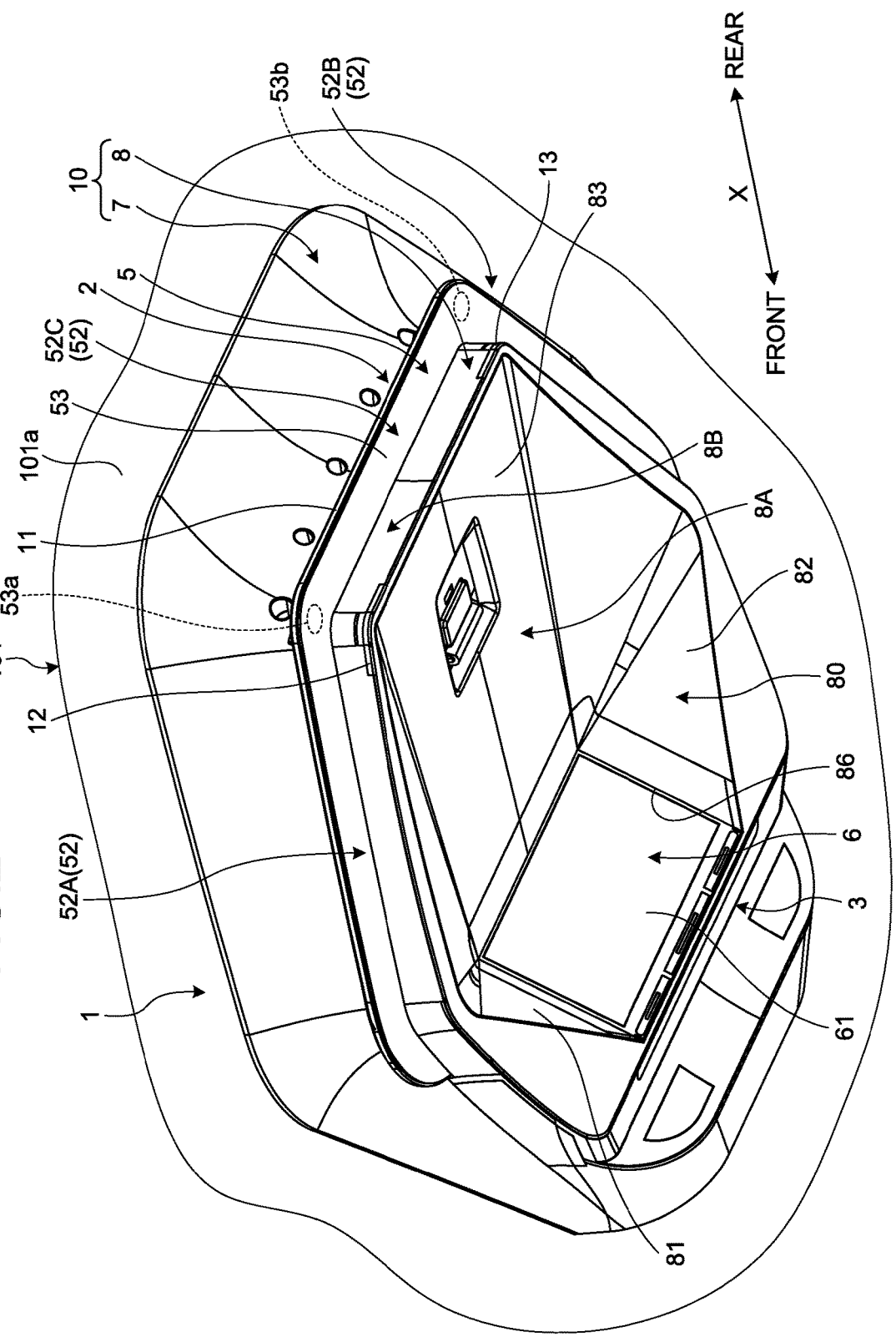
FIG. 2 is a perspective view of the roof module according to the embodiment.
Figure 3:
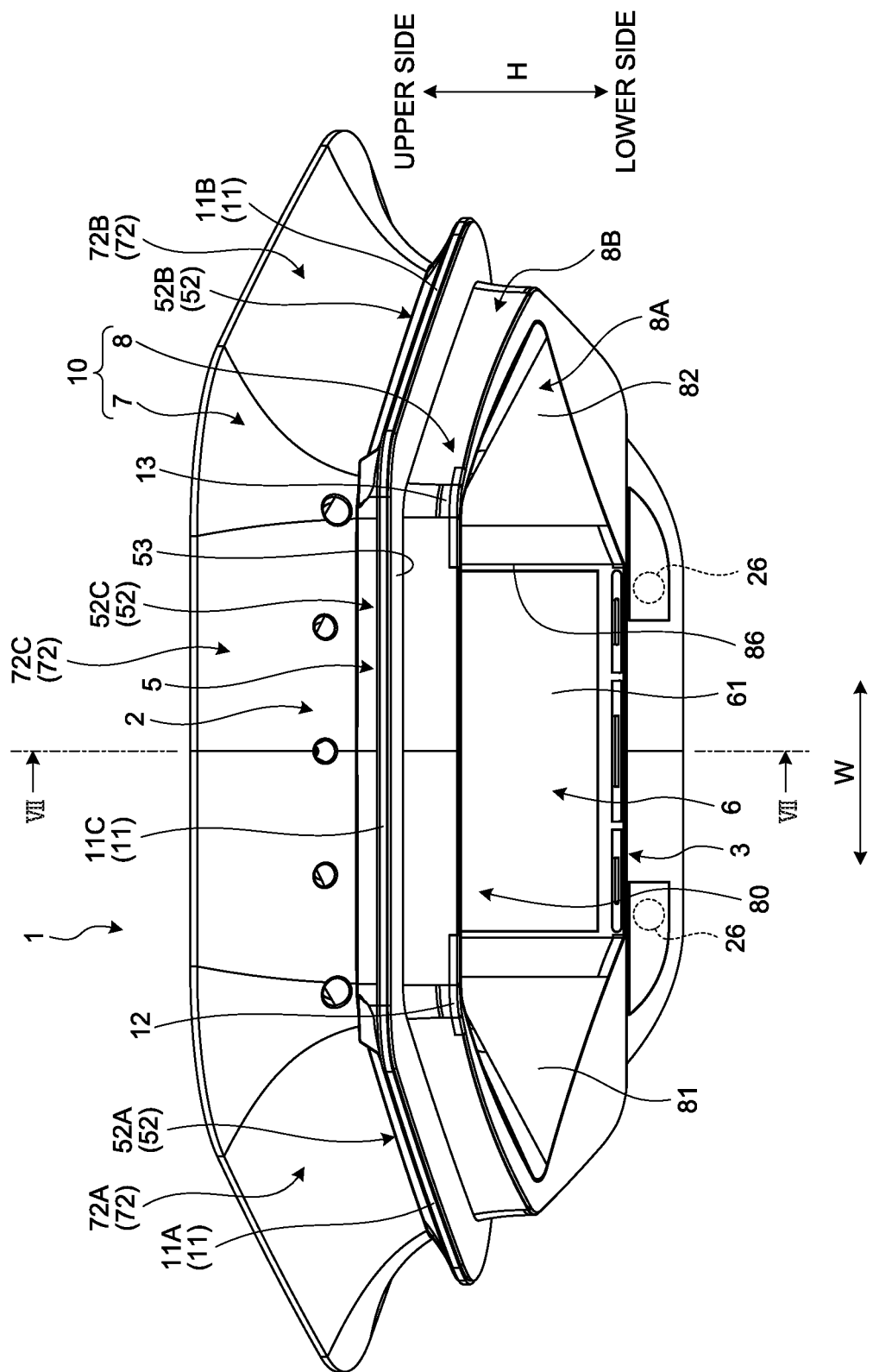
FIG. 3 is a front view of the roof module according to the embodiment.
Figure 4:
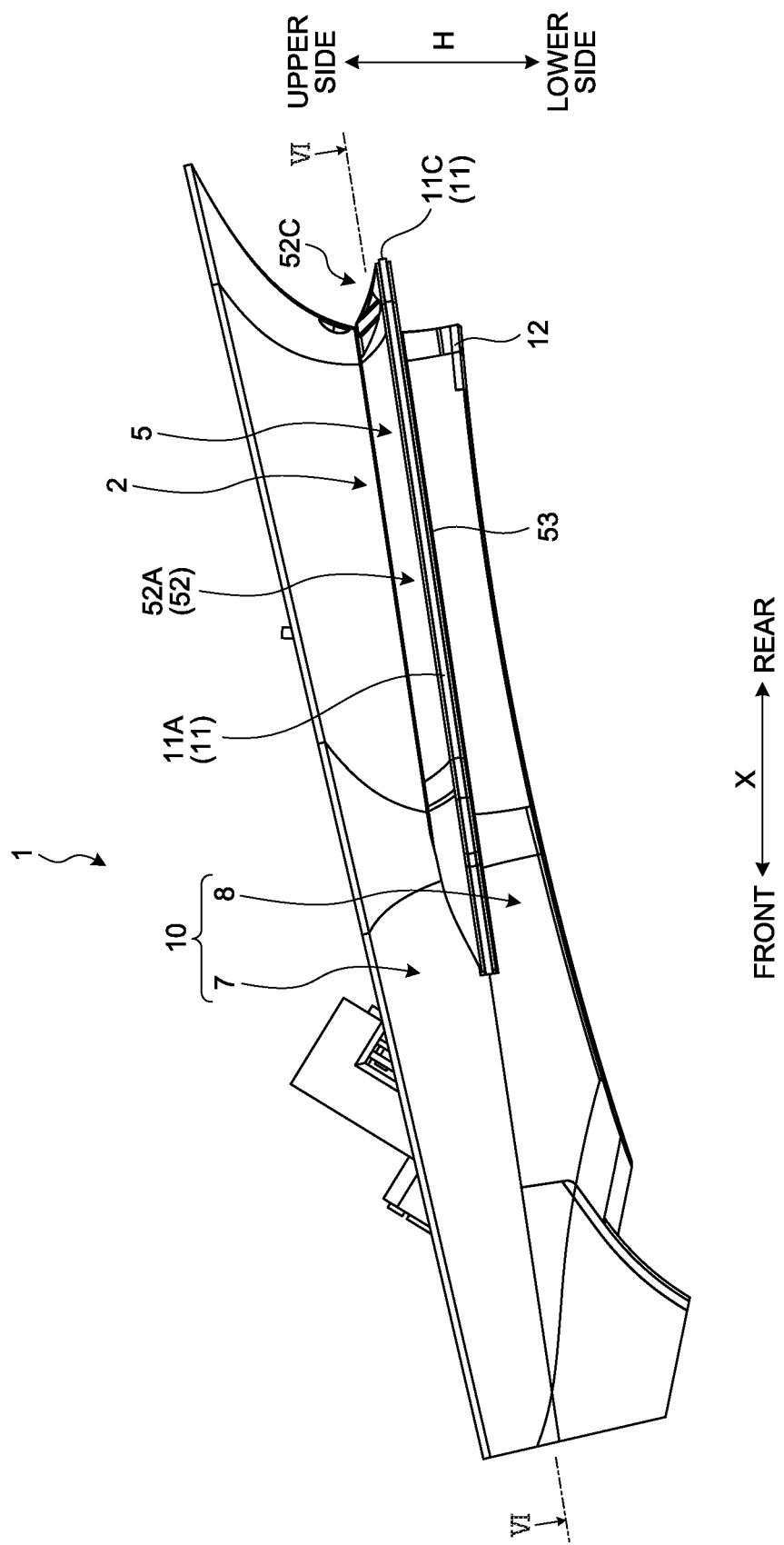
FIG. 4 is a side view of the roof module according to the embodiment.
Figure 5:
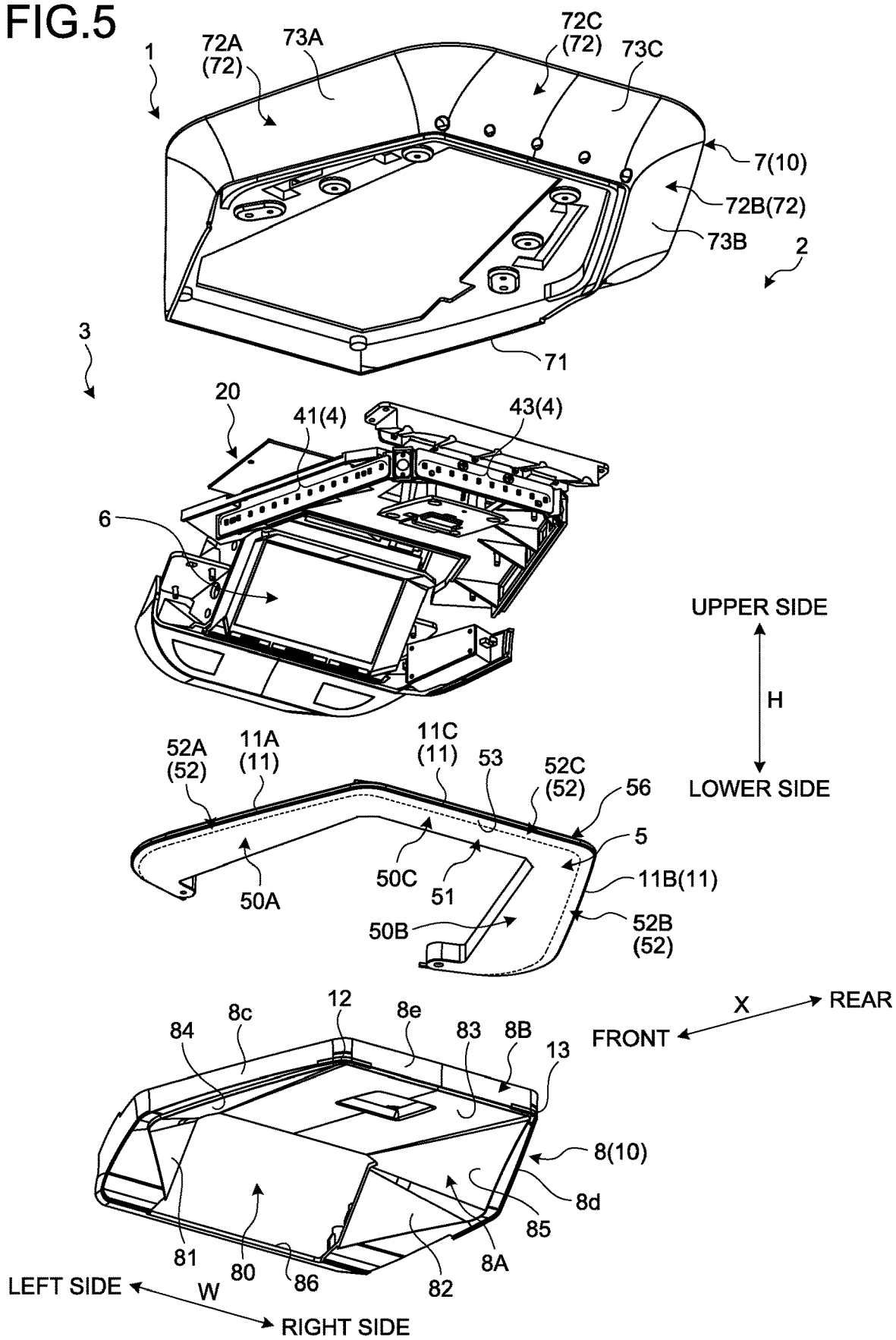
FIG. 5 is an exploded perspective view of the roof module according to the embodiment.
Figure 6:
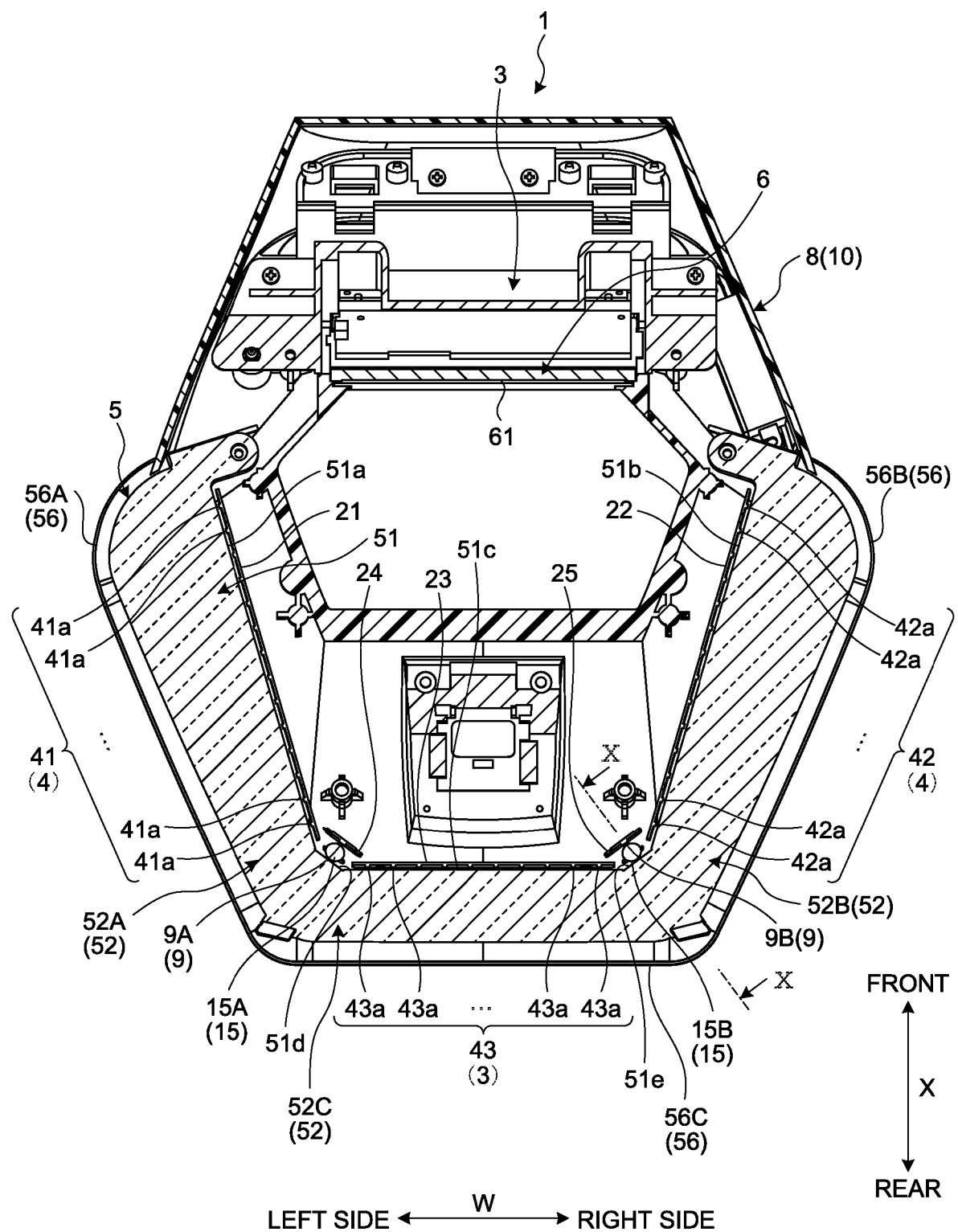
FIG. 6 is a cross-sectional view of the roof module according to the embodiment.
Figure 7:
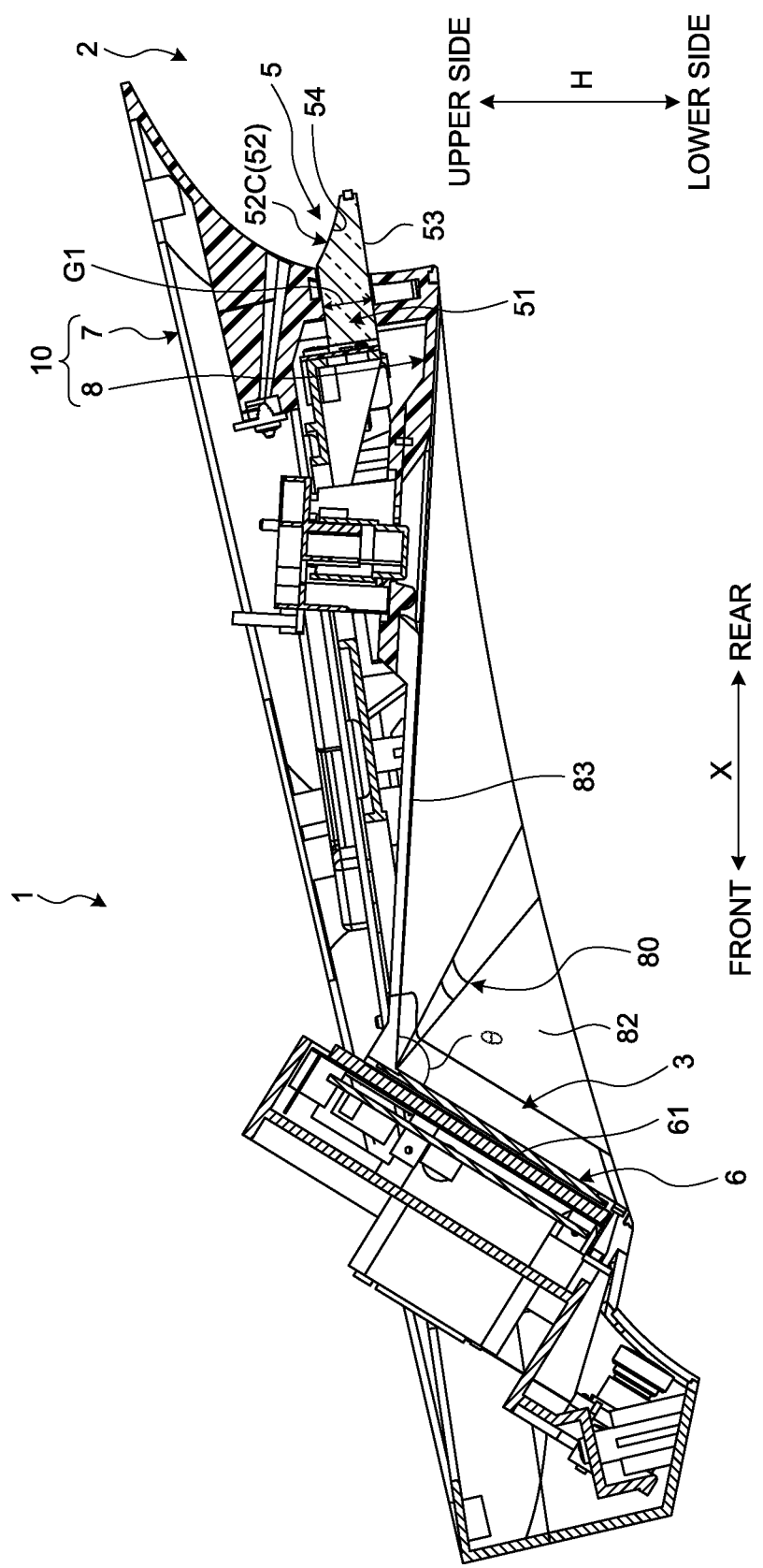
FIG. 7 is another cross-sectional view of the roof module according to the embodiment.
Figure 8:
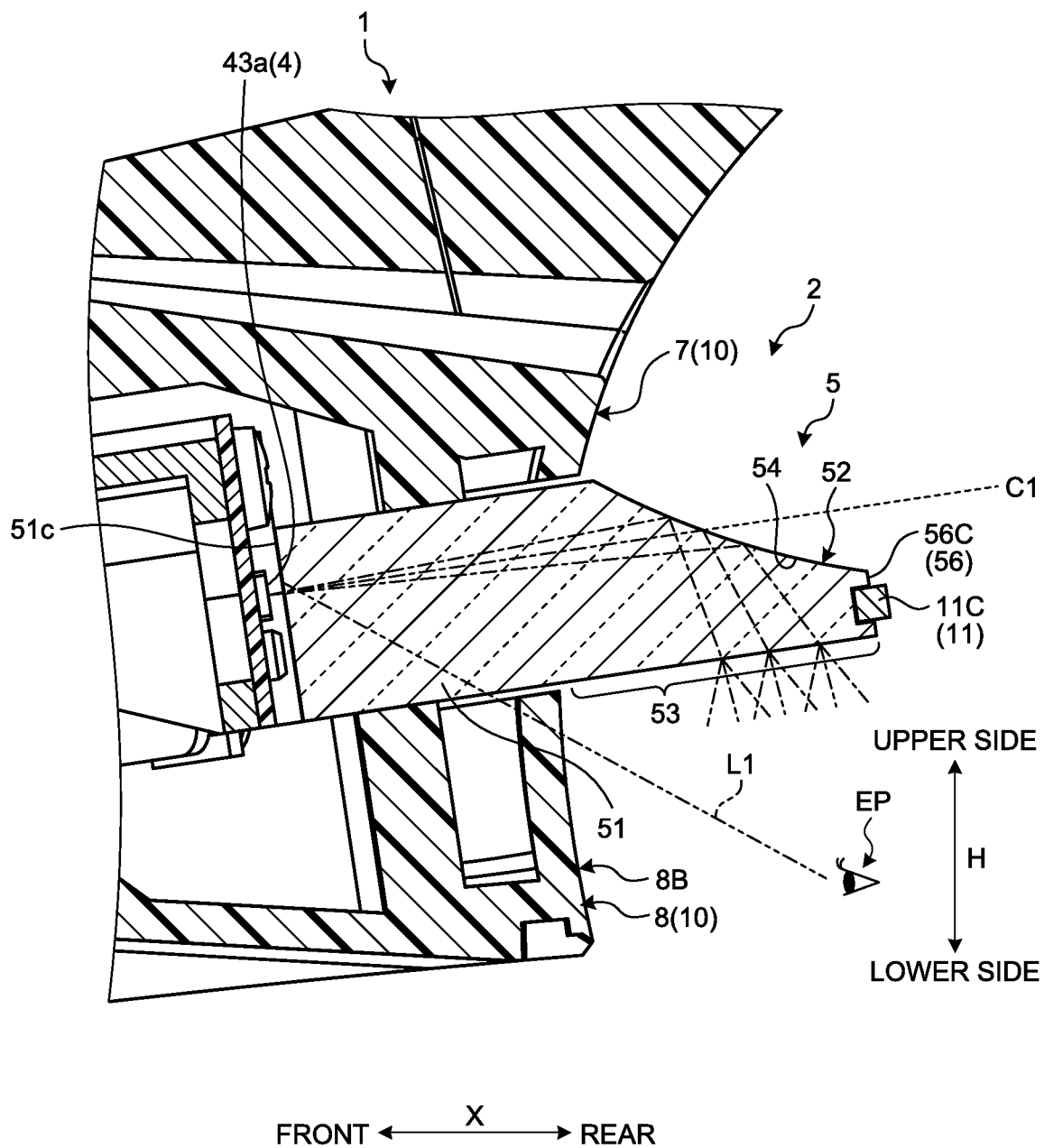
FIG. 8 is a cross-sectional view of a vehicular interior lighting device according to the embodiment.
Figure 9:
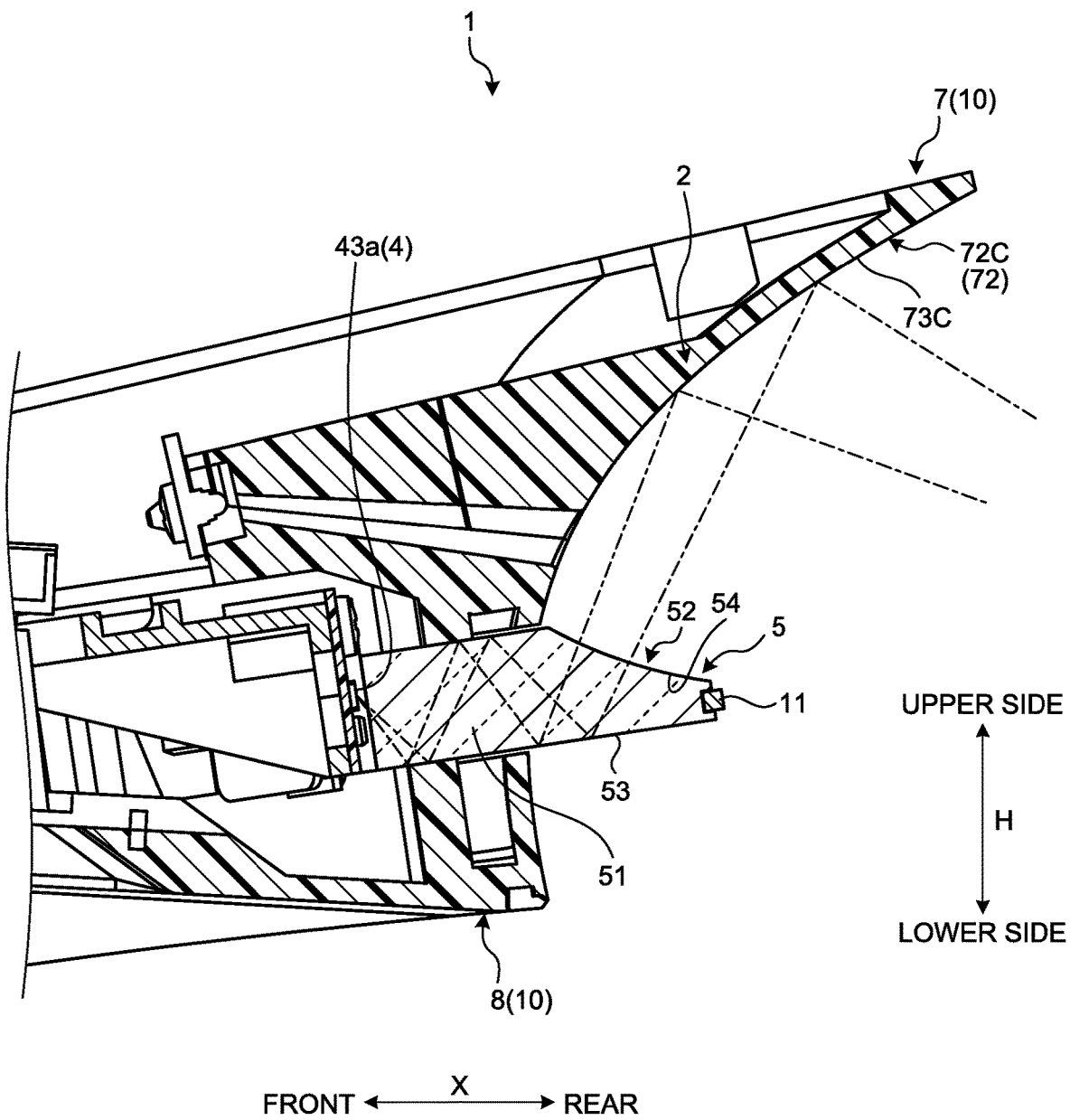
FIG. 9 is a cross-sectional view illustrating reflection of light by a skirt portion.
Figure 10:
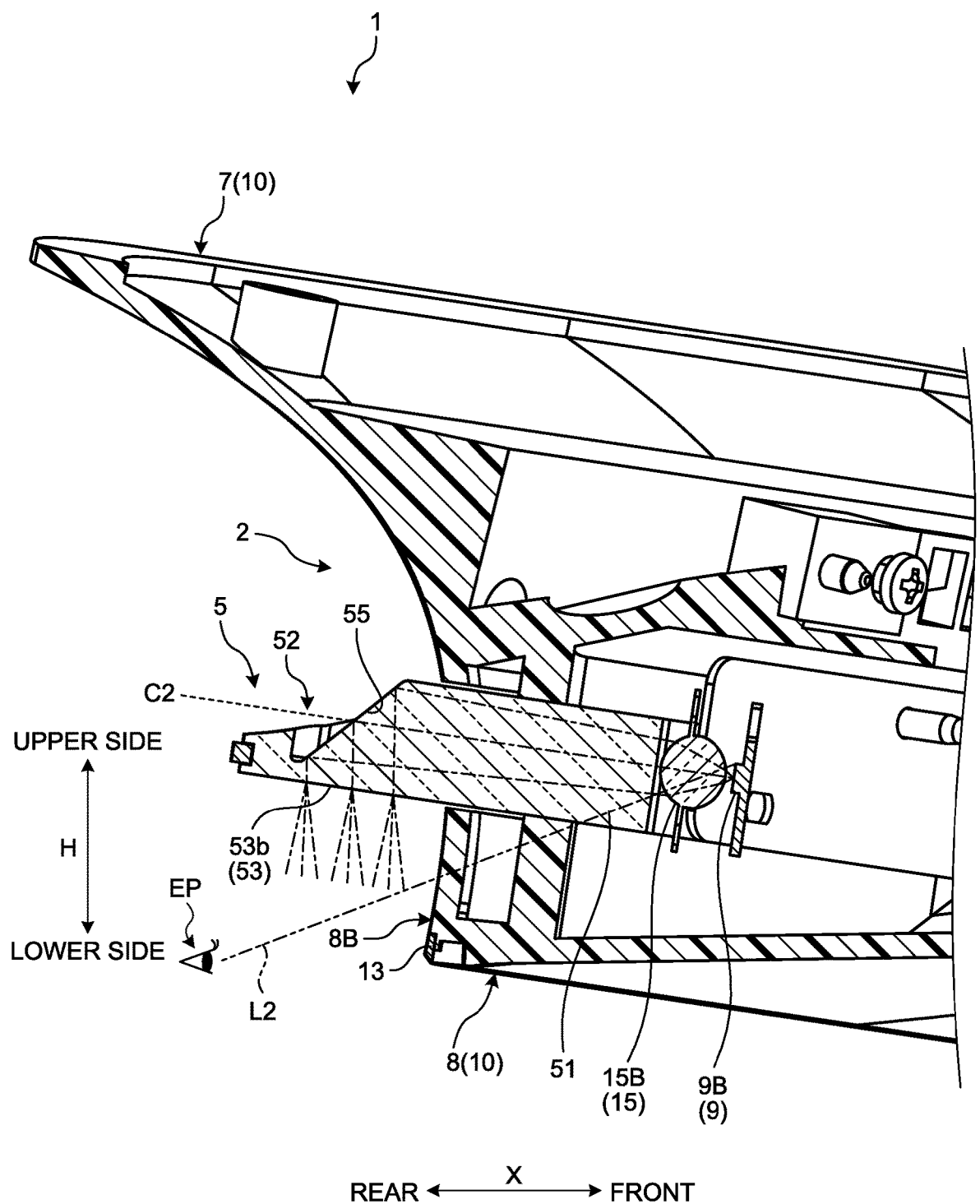
FIG. 10 is another cross-sectional view of the vehicular interior lighting device according to the embodiment.
Figure 11:
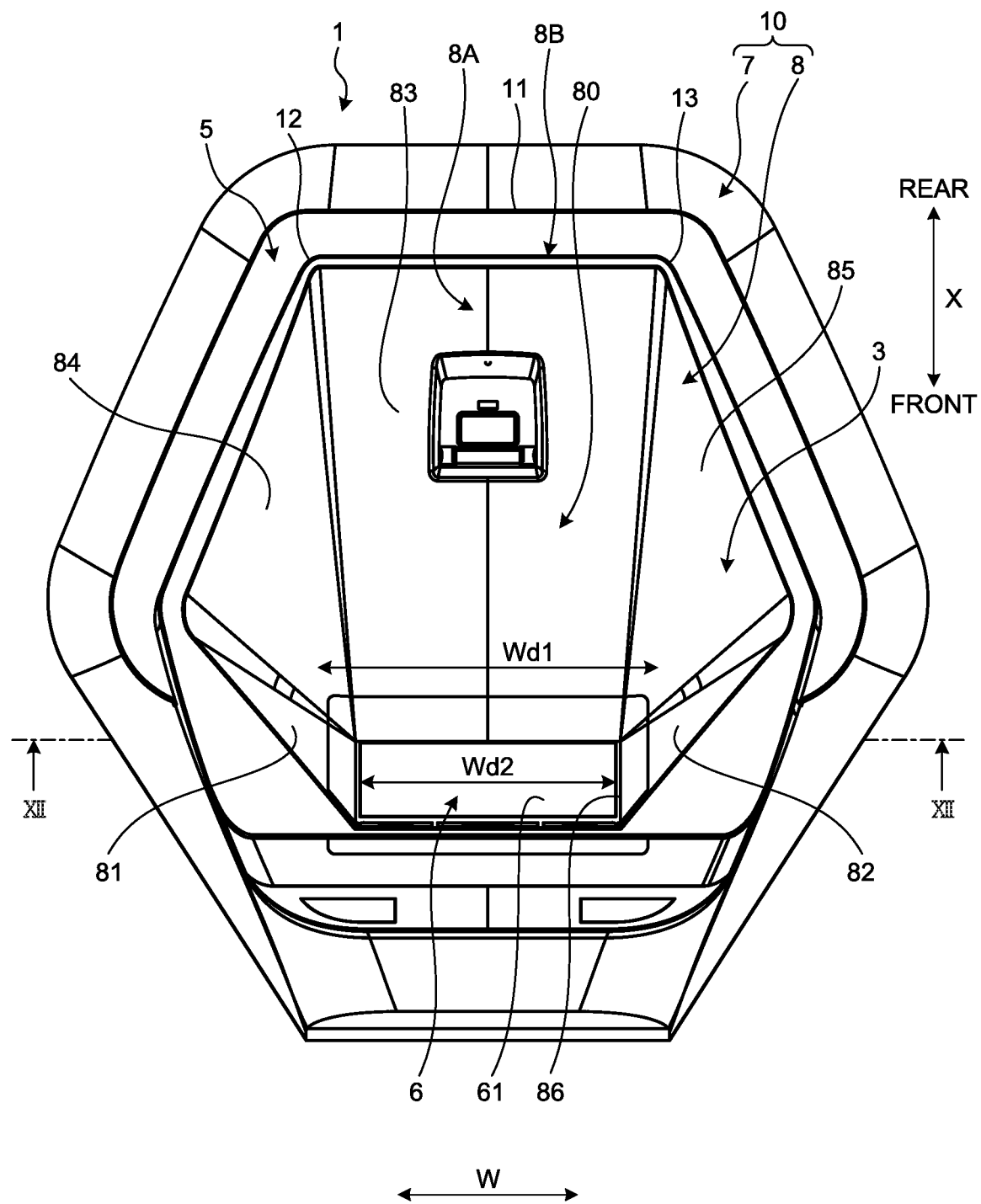
FIG. 11 is a bottom view of the roof module according to the embodiment.
Figure 12:
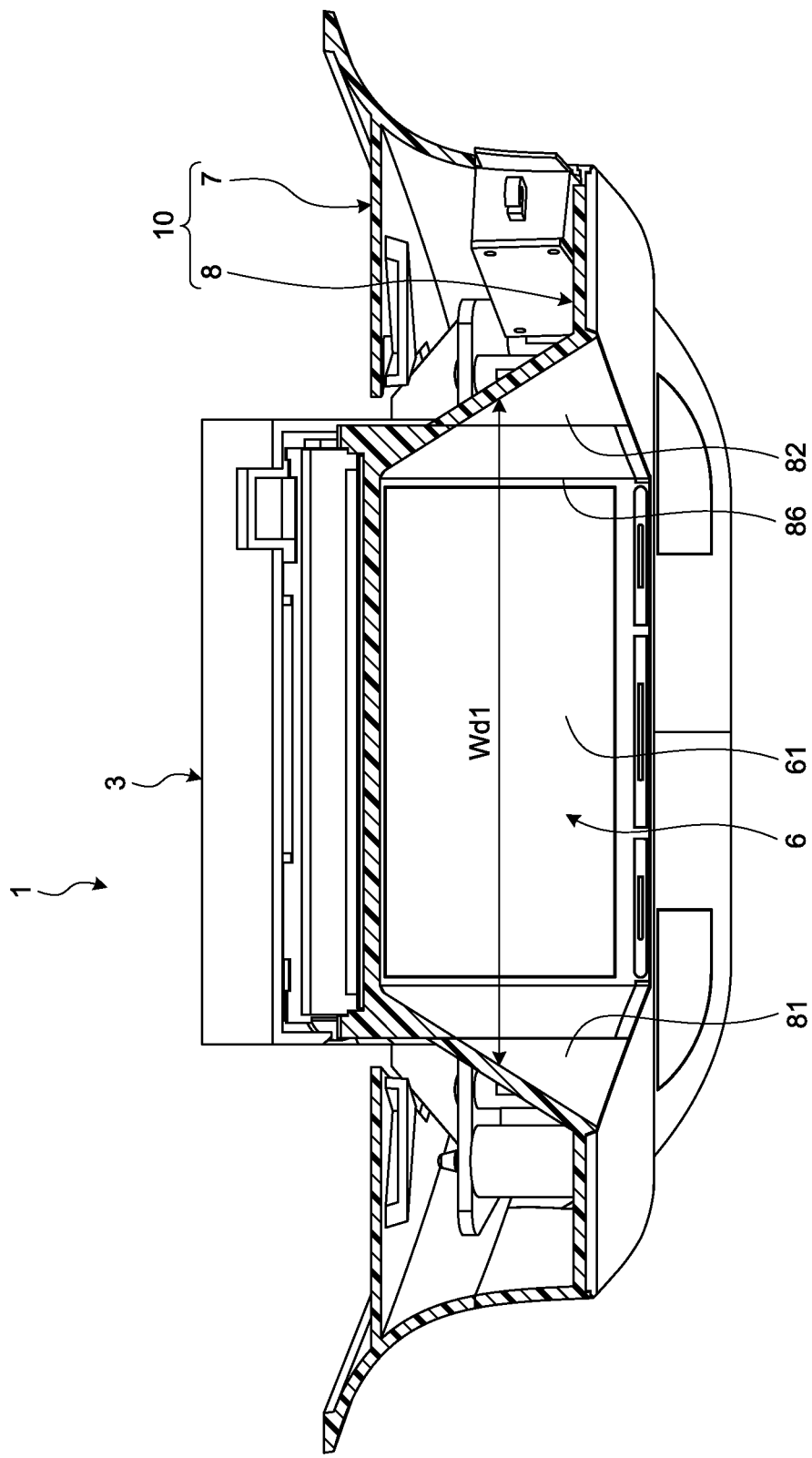
FIG. 12 is a cross-sectional view of the roof module according to the embodiment.

The embodiment will be described with reference to FIGS. 1 to 12. The present embodiment relates to the vehicular interior lighting device and the roof module. FIG. 1 is a diagram illustrating the disposition of the roof module according to the embodiment. FIG. 2 is a perspective view of the roof module according to the embodiment. FIG. 3 is a front view of the roof module according to the embodiment. FIG. 4 is a side view of the roof module according to the embodiment. FIG. 5 is an exploded perspective view of the roof module according to the embodiment. FIG. 6 is a cross-sectional view of the roof module according to the embodiment. FIG. 7 is another cross-sectional view of the roof module according to the embodiment. FIG. 8 is a cross-sectional view of the vehicular interior lighting device according to the embodiment. FIG. 9 is a cross-sectional view illustrating reflection of light by a skirt portion. FIG. 10 is another cross-sectional view of the vehicular interior lighting device according to the embodiment. FIG. 11 is a bottom view of the roof module according to the embodiment. FIG. 12 is a cross-sectional view of the roof module according to the embodiment.

The VI-VI cross section of FIG. 4 is illustrated in FIG. 6. The VII-VII cross section of FIG. 3 is illustrated in FIG. 7. A cross section at the same cross-sectional position as FIG. 7 is illustrated in FIGS. 8 and 9. The X-X cross section of FIG. 6 is illustrated in FIG. 10. The XII-XII cross section of FIG. 11 is illustrated in FIG. 12.

As illustrated in FIG. 1, a roof module 1 according to the present embodiment is mounted in a vehicle 100. The roof module 1 is fixed to an inside surface 101a of a roof 101 of the vehicle 100. The inside surface 101a is the surface of the roof 101 that is on the cabin side. Typically, the inside surface 101a is a surface facing downward. The roof module 1 is fixed to, for example, the inside surface 101a of a roof panel.

The roof module 1 includes a vehicular interior lighting device 2 and a vehicular display device 3. The vehicular interior lighting device 2 is a device illuminating the inside of the cabin of the vehicle 100. The vehicular display device 3 is a display device disposed in the cabin of the vehicle 100 and displaying an image or a video. The roof module 1 of the present embodiment is a unit in which the lighting device and the display device are integrated.

In the description of the roof module 1 of the present embodiment, "front" and "rear" indicate the front and the rear in a vehicle front-rear direction X, respectively. In addition, "upper side" and "lower side" indicate the upper and lower sides in a vehicle up-down direction H, respectively.

The roof module 1 is disposed at, for example, a position above a front seat 102 or a position in front of the front seat 102. In this case, the roof module 1 is positioned above and in front of a passenger P1 seated in the front seat 102. The roof module 1 is configured such that the passenger P1 can visually recognize a display surface 61 of the vehicular display device 3. In addition, the roof module 1 is configured such that a passenger P2 seated in a rear seat 103 can visually recognize the display surface 61. It is desirable that the roof module 1 is configured such that every passenger P2 can visually recognize the display surface 61. In a case where three or more rows of seats are mounted in the vehicle 100, for example, the roof module 1 is configured such that all of the passengers P2 seated in the second and third rows can visually recognize the display surface 61.

As illustrated in FIG. 2, a housing 10 is fixed to the inside surface 101a of the roof panel or the like. In other words, in the roof module 1 of the present embodiment, the housing 10 protrudes downward from the inside surface 101a. The roof module 1 is connected to the power source of the vehicle 100 via a wire harness wired to the roof 101 and receives electric power supply from the power source.

As illustrated in FIG. 5, the roof module 1 includes the housing 10, a light guide member 5, a display device 6, a first light source 4, and the like. In the roof module 1 of the present embodiment, the vehicular interior lighting device 2 and the vehicular display device 3 share one housing 10.

The housing 10 has a main body portion 7 and a cover portion 8. The housing 10 is formed of, for example, an insulating synthetic resin. The housing 10 of the present embodiment is formed of a light shielding material. In the present embodiment, the main body portion 7 and the cover portion 8 are separate members. The main body portion 7 and the cover portion 8 are combined to constitute the housing 10. The main body portion 7 is fixed to the roof 101 of the vehicle 100. The main body portion 7 is formed in a substantially tubular shape. The upper and lower sides of the main body portion 7 are open.

The cover portion 8 is fixed to the main body portion 7 so as to cover a lower opening portion 71 of the main body portion 7. In the housing 10 of the present embodiment, a slit-shaped opening is formed between the cover portion 8 and the main body portion 7 in a state where the cover portion 8 is fixed to the main body portion 7. More specifically, a gap allowing the light guide member 5 to protrude is provided between the opening portion 71 of the main body portion 7 and a peripheral wall 8B of the cover portion 8.

As illustrated in the drawings including FIGS. 5 to 7, the vehicular interior lighting device 2 includes the housing 10, the first light source 4, a second light source 9, the light guide member 5, and a control board 20. The vehicular display device 3 includes the housing 10, the display device 6, and the control board 20.

Details of the vehicular interior lighting device 2 will be described. The light guide member 5 is a translucent member and guides the light that is emitted from the first light source 4 and the second light source 9 to the space outside the housing 10. The light guide member 5 is formed of, for example, a colored or colorless transparent material. The light guide member 5 is formed of, for example, a resin material such as an acrylic resin. The light guide member 5 of the present embodiment is a plate-shaped member and is formed so as to be substantially U-shaped in plan view.

As illustrated in the drawings including FIG. 5, the light guide member 5 has a left side plate-shaped portion 50A, a right side plate-shaped portion 50B, and a rear side plate-shaped portion 50C. Each of the left side plate-shaped portion 50A and the right side plate-shaped portion 50B extends mainly along the vehicle front-rear direction X. The rear side plate-shaped portion 50C extends along a vehicle width direction W and connects the rear end of the left side plate-shaped portion 50A and the rear end of the right side plate-shaped portion 50B. The left side plate-shaped portion 50A is positioned on the left side in the vehicle width direction W with respect to the rear side plate-shaped portion 50C. The right side plate-shaped portion 50B is positioned on the right side in the vehicle width direction W with respect to the rear side plate-shaped portion 50C. "Left side" and "right side" in the vehicle width direction W indicate the left side and the right side in the case of facing the front of the vehicle.

The direction of extension of the left side plate-shaped portion 50A and the direction of extension of the right side plate-shaped portion 50B are inclined with respect to the vehicle front-rear direction X. Specifically, the direction of extension of the left side plate-shaped portion 50A is inclined with respect to the vehicle front-rear direction X so as to be directed to the left side in the vehicle width direction W toward the front of the vehicle. The direction of extension of the right side plate-shaped portion 50B is inclined with respect to the vehicle front-rear direction X so as to be directed to the right side in the vehicle width direction W toward the front of the vehicle. In other words, the gap between the left side plate-shaped portion 50A and the right side plate-shaped portion 50B in the vehicle width direction W widens toward the front of the vehicle.

The light guide member 5 has a first light guide portion 51 and a protruding portion 52. The first light guide portion 51 and the protruding portion 52 are integrally formed. The first light guide portion 51 is a part accommodated in the housing 10. The protruding portion 52 is a part protruding toward the space outside the housing 10 from the gap between the main body portion 7 and the cover portion 8. The protruding portion 52 is the outer edge portion of the light guide member 5.

The protruding portion 52 has a first protruding portion 52A, a second protruding portion 52B, and a third protruding portion 52C. The first protruding portion 52A is a part of the left side plate-shaped portion 50A and is a part protruding toward the left side in the vehicle width direction W. The second protruding portion 52B is a part of the right side plate-shaped portion 50B and is a part protruding toward the right side in the vehicle width direction W. The third protruding portion 52C is a part of the rear side plate-shaped portion 50C and is a part protruding toward the rear of the vehicle. The first protruding portion 52A, the second protruding portion 52B, and the third protruding portion 52C constitute the continuous and substantially U-shaped protruding portion 52.

As illustrated in FIGS. 5 and 6, the protruding portion 52 of the present embodiment has a ridge-shaped tip surface 56. The tip surface 56 is a surface facing the direction of protrusion of the protruding portion 52. For example, a first tip surface 56A, which is the tip surface of the first protruding portion 52A, faces the left side in the vehicle width direction W. A second tip surface 56B, which is the tip surface of the second protruding portion 52B, faces the right side in the vehicle width direction W. A third tip surface 56C, which is the tip surface of the third protruding portion 52C, faces the rear of the vehicle. The third tip surface 56C connects the first tip surface 56A and the second tip surface 56B. The first tip surface 56A, the second tip surface 56B, and the third tip surface 56C are smoothly continuous. For example, the rear end portion of the first tip surface 56A and the left end portion of the third tip surface 56C are interconnected while respectively curving. The rear end portion of the second tip surface 56B and the right end portion of the third tip surface 56C are interconnected while respectively curving.

A touch sensor 11 is disposed on the tip surface 56 of the protruding portion 52. The touch sensor 11 is, for example, a capacitive sensor. The touch sensor 11 has an electrode formed in an elongated plate shape or a rod shape.

The touch sensor 11 is continuously disposed from the first tip surface 56A to the second tip surface 56B via the third tip surface 56C. More specifically, the touch sensor 11 has a first sensor portion 11A, a second sensor portion 11B, and a third sensor portion 11C. The first sensor portion 11A, the second sensor portion 11B, and the third sensor portion 11C are integrated. The first sensor portion 11A is a part of the touch sensor 11 that is disposed on the first tip surface 56A. The second sensor portion 11B is a part of the touch sensor 11 that is disposed on the second tip surface 56B. The third sensor portion 11C is a part of the touch sensor 11 that is disposed on the third tip surface 56C. The third tip surface 56C is continuous with each of the first sensor portion 11A and the second sensor portion 11B.

A user can similarly operate a room lamp by touching any place of the first tip surface 56A, the second tip surface 56B, and the third tip surface 56C in the touch sensor 11. The electrode of the touch sensor 11 is electrically connected to a control circuit disposed in the housing 10. The control circuit is disposed on, for example, the control board 20. The control circuit controls the first light source 4 in response to operation input with respect to the touch sensor 11. For example, the control circuit switches between the on and off of the first light source 4 each time touch input with respect to the touch sensor 11 is detected.

The light guide member 5 is accommodated in the housing 10 such that the protruding portion 52 protrudes toward the outside of the housing 10. In other words, the first light guide portion 51 of the light guide member 5 is accommodated in the housing 10 and held by the housing 10. The protruding portion 52 of the light guide member 5 protrudes outward from the housing 10. More specifically, the protruding portion 52 protrudes toward the direction that is along the inside surface 101a of the roof 101 from the gap between the main body portion 7 and the cover portion 8 as illustrated in the drawings including FIG. 2. As described later, the protruding portion 52 emits light by means of the light that is emitted from the first light source 4 and the second light source 9 and illuminates the inside of the cabin.

The first light source 4 is a light source for a room lamp. The first light source 4 of the present embodiment is accommodated in the main body portion 7 of the housing 10. As illustrated in the drawings including FIG. 6, the first light source 4 has a left side first light source 41, a right side first light source 42, and a rear side first light source 43. The left side first light source 41 is disposed on the left side in the vehicle width direction W in the internal space of the housing 10. The right side first light source 42 is disposed on the right side in the vehicle width direction W in the internal space of the housing 10. The rear side first light source 43 is disposed at the rear of the vehicle in the internal space of the housing 10.

Each of the left side first light source 41, the right side first light source 42, and the rear side first light source 43 has a plurality of light emitting units. The first light source 4 of the present embodiment has a light emitting element such as a light emitting diode (LED) as the light emitting unit. The left side first light source 41 has a plurality of LEDs 41a. The plurality of LEDs 41a are fixed to a substrate 21. The LED 41a is disposed so as to face the left side in the vehicle width direction W. The plurality of LEDs 41a are disposed at predetermined intervals along the vehicle front-rear direction X.

The right side first light source 42 has a plurality of LEDs 42a. The plurality of LEDs 42a are fixed to a substrate 22. The LED 42a is disposed so as to face the right side in the vehicle width direction W. The plurality of LEDs 42a are disposed at predetermined intervals along the vehicle front-rear direction X. The directions of arrangement of the left side first light source 41 and the right side first light source 42 are inclined with respect to the vehicle front-rear direction X. The direction of arrangement of the LEDs 41a of the left side first light source 41 is inclined with respect to the vehicle front-rear direction X so as to be directed to the left side in the vehicle width direction W toward the front of the vehicle. The direction of arrangement of the LEDs 42a of the right side second light source is inclined with respect to the vehicle front-rear direction X so as to be directed to the right side in the vehicle width direction W toward the front of the vehicle. Accordingly, the gap between the left side first light source 41 and the right side first light source 42 in the vehicle width direction W widens toward the front of the vehicle.

The rear side first light source 43 has a plurality of LEDs 43a. The plurality of LEDs 43a are fixed to a substrate 23. The LED 43a is disposed so as to face the rear of the vehicle. The plurality of LEDs 43a are disposed at predetermined intervals along the vehicle width direction W. The rear side first light source 43 is disposed between the rear end portion of the left side first light source 41 and the rear end portion of the right side first light source 42. In other words, the left side first light source 41, the rear side first light source 43, and the right side first light source 42 are disposed so as to form a substantially U-shape.

The second light source 9 is a light source for a map lamp. The second light source 9 of the present embodiment is accommodated in the main body portion 7 of the housing 10. As illustrated in the drawings including FIG. 6, the second light source 9 has a left side second light source 9A and a right side second light source 9B. The left side second light source 9A is disposed at the corner where the left side first light source 41 and the rear side first light source 43 intersect with each other. In other words, the left side second light source 9A is disposed in the gap between the rear end of the left side first light source 41 and the left end of the rear side first light source 43. The left side second light source 9A is fixed to a substrate 24. One LED constitutes the left side second light source 9A of the present embodiment. The left side second light source 9A is disposed diagonally leftward and rearward.

The right side second light source 9B is disposed at the corner where the right side first light source 42 and the rear side first light source 43 intersect with each other. In other words, the right side second light source 9B is disposed in the gap between the rear end of the right side first light source 42 and the right end of the rear side first light source 43. The right side second light source 9B is fixed to a substrate 25. One LED constitutes the right side second light source 9B of the present embodiment. The right side second light source 9B is disposed diagonally rightward and rearward.

A condensing lens 15 is disposed on the optical axis of the second light source 9. The condensing lens 15 condenses the light that is emitted from the second light source 9 and causes the light to be incident on the light guide member 5. The condensing lens 15 of the present embodiment is a convex lens that has a convexly curved incident surface and a convexly curved emission surface. The condensing lens 15 has a spherical shape, a spheroid shape, or the like. The condensing lens 15 is disposed between the second light source 9 and the light guide member 5. The condensing lens 15 has a left side condensing lens 15A disposed between the left side second light source 9A and the light guide member 5 and a right side condensing lens 15B disposed between the right side second light source 9B and the light guide member 5.

The light guide member 5 has light incident surfaces 51a, 51b, 51c, 51d, and 51e. The light incident surfaces 51a, 51b, 51c, 51d, and 51e are, for example, mirror-finished. The light incident surface 51a is the surface of the first light guide portion 51 that faces the left side first light source 41. The light that is emitted by the left side first light source 41 is incident on the first light guide portion 51 from the light incident surface 51a. The light incident surface 51b is the surface of the first light guide portion 51 that faces the right side first light source 42. The light that is emitted by the right side first light source 42 is incident on the first light guide portion 51 from the light incident surface 51b. The light incident surface 51c is the surface of the first light guide portion 51 that faces the rear side first light source 43. The light that is emitted by the rear side first light source 43 is incident on the first light guide portion 51 from the light incident surface 51c.

The light incident surface 51d is the surface of the first light guide portion 51 that faces the left side second light source 9A. The light that is emitted by the left side second light source 9A is incident on the first light guide portion 51 from the light incident surface 51d via the left side condensing lens 15A. The light incident surface 51e is the surface of the first light guide portion 51 that faces the right side second light source 9B. The light that is emitted by the right side second light source 9B is incident on the first light guide portion 51 from the light incident surface 51e via the right side condensing lens 15B.

As described below, in the housing 10 according to the present embodiment, the planar shape of the part that is adjacent to the light guide member 5 corresponds to the shape of the light guide member 5. For example, the main body portion 7 has a substantially hexagonal shape in plan view as illustrated in the drawings including FIG. 5. The main body portion 7 has a curved skirt portion 72. The skirt portion 72 is a wall portion facing the protruding portion 52 of the light guide member 5 in the vehicle up-down direction H. The skirt portion 72 is positioned above the protruding portion 52. The skirt portion 72 is inclined so as to protrude outward toward upside. The skirt portion 72 is curved so as to have a concave outside surface. The skirt portion 72 has a hem-spreading shape, and thus the edge of the skirt portion 72 and the inside surface 101*a* of the roof 101 are smoothly continuous. As a result, the sense of unity between the skirt portion 72 and the roof 101 is improved.

The skirt portion 72 has a first skirt portion 72A, a second skirt portion 72B, and a third skirt portion 72C. The first skirt portion 72A is a wall portion facing the first protruding portion 52A of the light guide member 5. The second skirt portion 72B is a wall portion facing the second protruding portion 52B of the light guide member 5. The third skirt portion 72C is a wall portion facing the third protruding portion 52C of the light guide member 5. The first skirt portion 72A, the second skirt portion 72B, and the third skirt portion 72C constitute one continuous wall portion. In other words, an outside surface 73A of the first skirt portion 72A is continuous with an outside surface 73C of the third skirt portion 72C while curving. An outside surface 73B of the second skirt portion 72B is continuous with the outside surface 73C of the third skirt portion 72C while curving.

The directions of extension of the first skirt portion 72A and the second skirt portion 72B are inclined with respect to the vehicle front-rear direction X. In other words, the direction of extension of the first skirt portion 72A is inclined with respect to the vehicle front-rear direction X so as to be directed to the left side in the vehicle width direction W toward the front of the vehicle. The direction of extension of the second skirt portion 72B is inclined with respect to the vehicle front-rear direction X so as to be directed to the right side in the vehicle width direction W toward the front of the vehicle. The first skirt portion 72A extends along the first protruding portion 52A of the light guide member 5. The second skirt portion 72B extends along the second protruding portion 52B of the light guide member 5. The third skirt portion 72C extends along the vehicle width direction W. In other words, the third skirt portion 72C extends along the third protruding portion 52C of the light guide member 5.

The shape of the cover portion 8 in plan view is substantially hexagonal. The cover portion 8 has a cover main body 8A and the peripheral wall 8B. The cover main body 8A and the peripheral wall 8B are integrated. The cover main body 8A is a plate-shaped component and covers the components accommodated in the main body portion 7 from below. The cover main body 8A has a concave portion 80 concave upward. In the cover portion 8 of the present embodiment, substantially the entire cover main body 8A is the concave portion 80.

The cover main body 8A has a first wall surface 81, a second wall surface 82, a third wall surface 83, a fourth wall surface 84, and a fifth wall surface 85. The first wall surface 81 is the lower left side wall portion of the concave portion 80. The second wall surface 82 is the lower right side wall portion of the concave portion 80. The third wall surface 83 is the top wall portion of the concave portion 80. The fourth wall surface 84 is the upper left side wall portion of the concave portion 80. The fifth wall surface 85 is the upper right side wall portion of the concave portion 80.

The cover main body 8A has an opening portion 86. The opening portion 86 is formed in the front end portion of the concave portion 80. The shape of the opening portion 86 is rectangular. The display surface 61 of the display device 6 is disposed in the opening portion 86. The opening portion 86 is inclined so as to be directed to the rear of the vehicle upward along the vehicle up-down direction H.

As illustrated in FIGS. 5 and 11, the first wall surface 81 extends rearward from the left end of the opening portion 86. The second wall surface 82 extends rearward from the right end of the opening portion 86. The third wall surface 83 extends rearward from the upper end of the opening portion 86. In other words, the opening portion 86 is surrounded from three sides by the first wall surface 81, the second wall surface 82, and the third wall surface 83. The first wall surface 81 and the second wall surface 82 face each other in the vehicle width direction W. The fourth wall surface 84 connects the upper end of the first wall surface 81 and the left end of the third wall surface 83. The fourth wall surface 84 is an inclined surface inclined with respect to the vehicle up-down direction H. The fifth wall surface 85 connects the upper end of the second wall surface 82 and the right end of the third wall surface 83. The fifth wall surface 85 is an inclined surface inclined with respect to the vehicle up-down direction H.

The peripheral wall 8B is a wall portion surrounding the cover main body 8A. The peripheral wall 8B is erected upward from the edge portion of the cover main body 8A. A gap from which the protruding portion 52 of the light guide member 5 protrudes is provided between the upper end of the peripheral wall 8B and the main body portion 7.

As illustrated in the drawings including FIG. 5, a left touch sensor 12 and a right touch sensor 13 are disposed on the peripheral wall 8B. The left touch sensor 12 and the right touch sensor 13 are, for example, capacitive sensors. The left touch sensor 12 and the right touch sensor 13 have electrodes formed in an elongated plate shape or a rod shape.

The left touch sensor 12 is a sensor for a user to operate the map lamp that is on the left side. The left touch sensor 12 is disposed at the rear left corner of the peripheral wall 8B. The left touch sensor 12 extends to both a left side surface 8*c* and a rear surface 8*e* of the peripheral wall 8B. The right touch sensor 13 is a sensor for a user to operate the map lamp that is on the right side. The right touch sensor 13 is disposed at the rear right corner of the peripheral wall 8B. The right touch sensor 13 extends to both a right side surface 8*d* and the rear surface 8*e* of the peripheral wall 8B.

The electrodes of the left touch sensor 12 and the right touch sensor 13 are electrically connected to a control circuit disposed in the housing 10. The control circuit is disposed on, for example, the control board 20. The control circuit controls the left side second light source 9A in response to operation input with respect to the left touch sensor 12 and controls the right side second light source 9B in response to operation input with respect to the right touch sensor 13. For example, the control circuit switches between the on and off of the left side second light source 9A each time touch input with respect to the left touch sensor 12 is detected. Likewise, the control circuit switches between the on and off of the right side second light source 9B each time touch input with respect to the right touch sensor 13 is detected.

As illustrated in FIG. 7, the light guide member 5 is held by the housing 10 in a state where the protruding portion 52 protrudes from a gap G1 between the main body portion 7 and the cover portion 8. The surface of the protruding portion 52 that faces downward is a flat surface. As illustrated in FIG. 8, the protruding portion 52 has a reflecting portion 54. The reflecting portion 54 is the inside surface of the protruding portion 52 and reflects downward the light emitted from the first light source 4.

As illustrated in FIG. 8, the first light source 4 is disposed so as to face the direction of protrusion of the protruding portion 52. The light emitted from the first light source 4 is incident on the inner portion of the light guide member 5 from the light incident surface 51*c*. The light incident on the light guide member 5 is guided to the protruding portion 52 by the first light guide portion 51. The reflecting portion 54 is an inclined surface inclined with respect to an optical axis C1 of the first light source 4. The reflecting portion 54 is inclined downward away from the first light source 4 along the optical axis C1 of the first light source 4. The reflecting portion 54 is a curved surface convex toward the inside of the light guide member 5. The shape of the reflecting portion 54 is designed so as to reflect downward the light incident on the reflecting portion 54 from the first light source 4 side. For example, the reflecting portion 54 is configured to totally reflect the light that is incident along the optical axis C1. The reflecting portion 54 is formed by, for example, mirror finishing.

A diffusion portion 53 diffusing light is formed on the surface of the protruding portion 52 that faces downward. The diffusion portion 53 of the present embodiment is formed by surface processing with respect to the surface of the protruding portion 52. The surface processing with respect to the protruding portion 52 is, for example, so-called emboss processing. In the diffusion portion 53, multiple minute irregularities are formed on the surface of the protruding portion 52. The light that is emitted from the diffusion portion 53 is diffused by the irregularities. The diffusion portion 53 of the present embodiment is formed on the entire lower surface of the protruding portion 52.

The reflecting portion 54 is configured to reflect the light incident from the first light source 4 side toward the diffusion portion 53. Accordingly, the light emitted from the first light source 4 passes through the first light guide portion 51, is reflected by the reflecting portion 54, and is emitted to the outside from the diffusion portion 53. By the light being diffused in the diffusion portion 53, the passengers P1 and P2 feel as if the diffusion portion 53 emits light.

The light of the left side first light source 41 causes the whole of the diffusion portion 53 formed in the first protruding portion 52A to emit light. The light of the right side first light source 42 causes the whole of the diffusion portion 53 formed in the second protruding portion 52B to emit light. The light of the rear side first light source 43 causes the whole of the diffusion portion 53 formed in the third protruding portion 52C to emit light. Accordingly, the whole of the diffusion portion 53 emits light by the left side first light source 41, the right side first light source 42, and the rear side first light source 43 being turned on.

The vehicular interior lighting device 2 of the present embodiment looks like interior lighting by the protruding portion 52 protruding from the housing 10 shining and is capable of giving a user a visually novel impact. As the light that has passed through the light guide member 5 shines so as to wrap the light guide member 5, the light guide member 5 looks as if floating, which is novel.

Especially, the vehicular interior lighting device 2 of the present embodiment is configured such that the passengers P1 and P2 cannot visually recognize the first light source 4. Specifically, the peripheral wall 8B of the cover portion 8 is configured to shield the first light source 4 with respect to a visual position EP of the passengers P1 and P2. In other words, the peripheral wall 8B is disposed so as to intersect with a virtual line segment L1 connecting the first light source 4 and the visual position EP of the passengers P1 and P2. Since the first light source 4 cannot be viewed from the passengers P1 and P2, the passengers P1 and P2 feel as if the diffusion portion 53 shines as a surface light source. Accordingly, the vehicular interior lighting device 2 of the present embodiment is capable of realizing novel lighting giving the passengers P1 and P2 a feeling of floating. As a result of the surface light emission of the protruding portion 52 protruding laterally from the housing 10, it looks on the part of the passengers P1 and P2 as if a luminous body is afloat in the air. In a case where the cover portion 8 is given a dark color such as black, the contrast of light and dark between the cover portion 8 and the protruding portion 52 stands out and the feeling of floating is improved.

As illustrated in FIG. 9, the skirt portion 72 of the main body portion 7 reflects the light leaked from the protruding portion 52. More specifically, the outside surfaces 73A, 73B, and 73C of the skirt portion 72 function as reflecting surfaces for the light leaking upward from the reflecting portion 54 to be reflected downward. The outside surfaces 73A, 73B, and 73C are surface-treated for high-reflectance light reflection. The outside surfaces 73A, 73B, and 73C dimly illuminate the periphery of the roof module 1 by reflecting the light leaked from the protruding portion 52. By the light emitted from the first light source 4 partially leaking upward from the reflecting portion 54, the light reaches the space above the protruding portion 52 as well. As a result, the outside surfaces 73A, 73B, and 73C function as indirect lighting and produce a sense of luxury. By the surface of the part other than the diffusion portion 53 being mirror-finished in the light guide member 5, it is possible to improve a crystal feeling and a sense of transparency.

A map lamp structure including the right side second light source 9B will be described with reference to FIG. 10. A map lamp structure including the left side second light source 9A is similar to the map lamp structure including the right side second light source 9B. As illustrated in FIG. 10, the right side second light source 9B is disposed so as to face the light incident surface 51e. The right side condensing lens 15B is disposed between the light incident surface 51e and the right side second light source 9B. The light that is emitted from the right side second light source 9B is guided to the light incident surface 51e by the right side condensing lens 15B.

The right side condensing lens 15B condenses the light that is emitted from the right side second light source 9B and emits light along an optical axis C2 of the right side second light source 9B. The light that is emitted from the right side condensing lens 15B is incident on the first light guide portion 51 from the light incident surface 51e. The first light guide portion 51 guides the light to the protruding portion 52. The protruding portion 52 is provided with a reflecting portion 55 intersecting with the optical axis C2. The reflecting portion 55 is an inclined surface inclined with respect to the optical axis C2 and is a flat surface or the like. The reflecting portion 55 is inclined downward away from the right side second light source 9B along the optical axis C2. The reflecting portion 55 is designed so as to reflect downward the light that is incident from the side of the right side second light source 9B. The reflecting portion 55 is, for example, configured to totally reflect the light that is incident along the optical axis C2. The reflecting portion 55 is formed by, for example, mirror finishing.

The reflecting portion 55 is configured to reflect the light that is incident from the side of the right side second light source 9B toward the diffusion portion 53. Accordingly, the light that is emitted from the right side second light source 9B passes through the right side condensing lens 15B and the first light guide portion 51, is reflected by the reflecting portion 55, and is emitted to the outside from the diffusion portion 53. Since the light is condensed on the reflecting portion 55 by the right side condensing lens 15B, the luminous efficiency with respect to the irradiation range of the map lamp is improved.

The right side condensing lens 15B illuminates a partial region in the diffusion portion 53 by condensing light. The light of the right side second light source 9B illuminates, for example, a region 53b illustrated in FIG. 2. The shape of the region 53b is, for example, circular. The region 53b is an intersection where the second protruding portion 52B and the third protruding portion 52C intersect with each other. In other words, the light guide member 5 causes the intersection where the second protruding portion 52B and the third protruding portion 52C intersect with each other in the diffusion portion 53 to emit light by means of the light emitted from the right side second light source 9B.

The light of the left side second light source 9A illuminates a region 53a illustrated in FIG. 2. The region 53a is an intersection where the first protruding portion 52A and the third protruding portion 52C intersect with each other. In other words, the light guide member 5 causes the intersection where the first protruding portion 52A and the third protruding portion 52C intersect with each other in the diffusion portion 53 to emit light by means of the light emitted from the left side second light source 9A.

The vehicular interior lighting device 2 of the present embodiment is configured such that the passengers P1 and P2 cannot visually recognize the second light source 9. Specifically, the peripheral wall 8B of the cover portion 8 is configured to shield the second light source 9 with respect to the visual position EP of the passengers P1 and P2 as illustrated in FIG. 10. The peripheral wall 8B is disposed so as to intersect with a virtual line segment L2 connecting the second light source 9 and the visual position EP of the passengers P1 and P2. Accordingly, the passengers P1 and P2 feel as if the regions 53a and 53b shine as spot light sources without noticing the presence of the second light source 9. The vehicular interior lighting device 2 of the present embodiment is capable of illuminating the regions 53a and 53b without the presence of the light path of the map lamp being noticed and is capable of producing novel lighting in the space in the cabin. By the presence of the second light source 9 not being noticed, a lighting device that can be harmonious with any design in the vehicle 100 is realized. As a result of the harmony with every design, the mountability of the vehicular interior lighting device 2 with respect to the vehicle 100 is improved.

In the vehicular interior lighting device 2 of the present embodiment, the touch sensor 11 is disposed on the tip surface 56 of the light guide member 5. The touch sensor 11 suppresses light leakage from the tip surface 56, and thus the passengers P1 and P2 hardly feel glare. The touch sensor 11 is configured to, for example, block light.

In the vehicular interior lighting device 2 of the present embodiment, the touch sensor 11 is continuously disposed on the tip surface 56. Since the installation range of the touch sensor 11 is wide, many passengers P1 and P2 can easily operate the room lamp. In addition, since the installation range of the touch sensor 11 is wide, it is possible to easily operate the touch sensor 11 even without directly looking at the touch sensor 11. Since the touch sensor 11 is disposed at the tip of the light guide member 5 in the direction of protrusion, the passengers P1 and P2 can easily operate the touch sensor 11 even by groping. For example, it is possible to easily operate the touch sensor 11 during forward gazing as well. Further, the touch sensor 11 of the present embodiment is unlikely to be mistaken for another switch and erroneous operations are unlikely to occur.

Since the touch sensor 11 is disposed on the tip surface 56 of the light guide member 5 and the touch sensor 11 is positioned below the inside surface 101a, the passengers P1 and P2 are close to the touch sensor 11 and switch operations are performed with ease. Since the touch sensor 11 is disposed on the lateral tip surface 56, the passengers P1 and P2 touch the touch sensor 11 not with their fingertips but with the insides of their fingers. As a result, the fingertips are less likely to hit the inside surface 101a and the like. The touch sensor 11 can be disposed with design ensured by means of the bezel portion on the outer periphery of the light guide member 5.

The touch sensor 11 may be divided into a plurality of parts. For example, the touch sensor 11 may be divided into three parts, that is, a part disposed on the first tip surface 56A, a part disposed on the second tip surface 56B, and a part disposed on the third tip surface 56C. In this case, the vehicular interior lighting device 2 may control a part of the first light source 4 in accordance with the touched part of the touch sensor 11. For example, the left side first light source 41 may be turned on and off in a case where the part of the touch sensor 11 that is disposed on the first tip surface 56A is touched. Likewise, the right side first light source 42 may be turned on and off in a case where the part disposed on the second tip surface 56B is touched. The entire first light source 4 may be turned on and off in a case where the part disposed on the third tip surface 56C is touched.

In the vehicular interior lighting device 2, the on and off operations of the first light source 4 may vary with how the touch sensor 11 is touched. For example, with the first light source 4 off, the first light source 4 may be turned on with high brightness in a case where the touch sensor 11 is touched for a short time and the first light source 4 may be turned on with low brightness in a case where the touch sensor 11 is touched for a long time.

Next, the vehicular display device 3 of the present embodiment will be described. The vehicular display device 3 has the housing 10, the display device 6, and the control board 20. The display device 6 is disposed in the opening portion 86 formed in the concave portion 80 of the cover portion 8 as illustrated in FIGS. 2 and 3. The opening portion 86 is formed at the position in the concave portion 80 that faces the rear of the vehicle. The display device 6 of the present embodiment is a liquid crystal display device such as a thin film transistor-liquid crystal display (TFT-LCD). The display device 6 has a liquid crystal display unit and a backlight. The backlight emits light from a back surface side to the liquid crystal display unit and projects the image that is displayed on the liquid crystal display unit toward the rear of the vehicle. The liquid crystal display unit and the backlight are controlled by a control circuit disposed in the housing 10. In the present embodiment, the control circuit of the display device 6 is disposed on the control board 20.

The display device 6 is disposed in the opening portion 86 with the display surface 61 facing the rear of the vehicle. In other words, the display device 6 is fixed to the housing 10 such that the display surface 61 can be visually recognized via the opening portion 86 from the rear side of the vehicle. As for the vehicular display device 3 of the present embodiment, the visibility of the display surface 61 can be improved by the display surface 61 being disposed in the concave portion 80 as described below.

Since the display surface 61 is disposed in the opening portion 86 formed in the concave portion 80, external light is less likely to be reflected on the display surface 61. The concave portion 80 covers the space that is closer to the rear of the vehicle than the display surface 61 from both sides in the vehicle width direction W. The first wall surface 81 extends from the left end of the opening portion 86 toward the rear of the vehicle and covers the space that is closer to the rear of the vehicle than the display surface 61 from the left side. The fourth wall surface 84 covers the space that is closer to the rear of the vehicle than the display surface 61 from the left side and from above. As a result, the cover portion 8 shields the display surface 61 from the external light from the left side in the vehicle width direction W and improves the visibility of the display surface 61.

The second wall surface 82 extends from the right end of the opening portion 86 toward the rear of the vehicle and covers the space that is closer to the rear of the vehicle than the opening portion 86 from the right side. The fifth wall surface 85 covers the space that is closer to the rear of the vehicle than the display surface 61 from the right side and from above. As a result, the cover portion 8 shields the display surface 61 from the external light from the right side in the vehicle width direction W and improves the visibility of the display surface 61.

The cover portion 8 of the present embodiment is configured such that the light of the room lamp or the map lamp is not reflected on the display surface 61. Specifically, the peripheral wall 8B protrudes downward from the light guide member 5 and shields the display surface 61 from the light that is emitted from the diffusion portion 53. As a result, the vehicular display device 3 of the present embodiment improves the visibility of the display surface 61. The display surface 61 is inclined such that light such as external light is reflected downward. In other words, the display surface 61 is inclined such that light such as external light is unlikely to be reflected toward the visual position EP of the passengers P1 and P2. For example, an angle θ between the third wall surface 83 and the display surface 61 is an obtuse angle as illustrated in FIG. 7. As a result, the light that is incident on the display surface 61 from the rear of the vehicle is mainly reflected downward. The third wall surface 83 of the present embodiment is inclined downward toward the rear of the vehicle. As a result, the housing 10 is capable of shielding the display surface 61 from the external light from the rear of the vehicle and improving the visibility of the display device 6.

As illustrated in FIG. 11, in the cover portion 8 of the present embodiment, a gap Wd1 between the first wall surface 81 and the second wall surface 82 in the vehicle width direction W is larger than a width Wd2 of the display surface 61. As a result, the display surface 61 can be easily viewed from the passengers P1 and P2. The gap Wd1 widens toward the rear of the vehicle. As a result, the cover portion 8 is capable of blocking lateral external light without hindering the gaze of the passengers P1 and P2 at the display surface 61. The inclination angles of the first wall surface 81 and the second wall surface 82 with respect to the vehicle front-rear direction X are determined such that the display surface 61 can be viewed from all of the passengers P1 and P2.

As illustrated in FIG. 12, the gap Wd1 between the first wall surface 81 and the second wall surface 82 in the vehicle width direction W widens downward. As a result, the cover portion 8 is capable of blocking lateral external light without hindering the gaze of the passengers P1 and P2 at the display surface 61. The inclination angles of the first wall surface 81 and the second wall surface 82 with respect to the vehicle up-down direction H are determined such that the display surface 61 can be viewed from all of the passengers P1 and P2.

As is apparent from FIGS. 4 and 7, the housing 10 shields the entire display surface 61 when viewed from the vehicle width direction W. In other words, the whole of the display surface 61 from the upper end to the lower end is covered from the side by the housing 10. As a result, the vehicular display device 3 of the present embodiment is capable of appropriately suppressing external light reflection to the display surface 61.

As illustrated in FIG. 3, the roof module 1 of the present embodiment has a camera 26 imaging the inside of the cabin. The camera 26 is accommodated below the display surface 61 in the housing 10. The roof module 1 of the present embodiment has two cameras 26 disposed side by side along the vehicle width direction W. The roof module 1 acquires, for example, a stereo image in which the passengers P1 and P2 are imaged by the two cameras 26. The roof module 1 may perform various types of guidance and warning for the passengers P1 and P2 based on the image captured by the camera 26. The various types of guidance and warning for the passengers P1 and P2 are made by the display device 6 or the like. The roof module 1 has a speaker in the housing 10. The roof module 1 may perform various types of guidance and warning by means of auditory information such as voice output from the speaker.

The cover portion 8 of the present embodiment provides blocking between the light guide member 5 and the camera 26, and thus the light of the room lamp or the map lamp does not strike the camera 26. As a result, the light of the room lamp or the map lamp is unlikely to deteriorate the imaging quality during the imaging of the inside of the cabin by the camera 26.

As described above, the vehicular interior lighting device 2 of the present embodiment has the main body portion 7, the first light source 4, the second light source 9, the cover portion 8, the light guide member 5, and the condensing lens 15. The main body portion 7 is fixed to the inside surface 101a, which is the surface of the roof 101 of the vehicle 100 that is on the cabin side. The first light source 4 and the second light source 9 are accommodated in the main body portion 7. The cover portion 8 is a light shielding cover portion, constitutes the housing 10 with the main body portion 7, and covers the first light source 4 and the second light source 9 from below. The light guide member 5 has the protruding portion 52 and guides the light emitted from the first light source 4 and the second light source 9 to the cabin. The protruding portion 52 protrudes toward the direction that is along the inside surface 101a from the gap G1 between the main body portion 7 and the cover portion 8. The condensing lens 15 is disposed between the second light source 9 and the light guide member 5.

The light guide member 5 has the diffusion portion 53 and the reflecting portion 55. The diffusion portion 53 is formed on the surface of the protruding portion 52 that faces downward and diffuses light. The reflecting portion 55 reflects the light emitted from the second light source 9 and incident on the light guide member 5 via the condensing lens 15 toward a part of the diffusion portion 53. In the light guide member 5, the diffusion portion 53 emits light in whole by the light emitted from the first light source 4 and a part of the diffusion portion 53 emits light by the light emitted from the second light source 9. In the vehicular interior lighting device 2 of the present embodiment, a part of the diffusion portion 53 emits light by means of the light of the second light source 9 covered by the cover portion 8. As a result, novel lighting providing a feeling of floating is realized.

The protruding portion 52 of the present embodiment has the first protruding portion 52A protruding toward one side in the vehicle width direction W, the second protruding portion 52B protruding toward the other side in the vehicle width direction W, and the third protruding portion 52C protruding toward the rear of the vehicle. The light emitted from the second light source 9 causes the intersection of the first protruding portion 52A and the third protruding portion 52C in the diffusion portion 53 to emit light and causes the intersection of the second protruding portion 52B and the third protruding portion 52C in the diffusion portion 53 to emit light. Novel spot lighting is realized by each of the intersections emitting the light.

In the present embodiment, the circular regions 53a and 53b in the diffusion portion 53 emit light by means of the light emitted from the second light source 9. By the circular regions 53a and 53b emitting the light, it is possible to illuminate an appropriate range as spot lighting.

The roof module 1 of the present embodiment includes the vehicular interior lighting device 2 and the display device 6 disposed in the concave portion 80 of the cover portion 8 and having the display surface 61 directed to the rear of the vehicle. Since the display device 6 is disposed in the concave portion 80, the visibility of the display device 6 is unlikely to deteriorate. As a result, the roof module 1 of the present embodiment is capable of realizing novel lighting while ensuring the visibility of the display device 6.

First Modification Example of Embodiment

Figure 13:
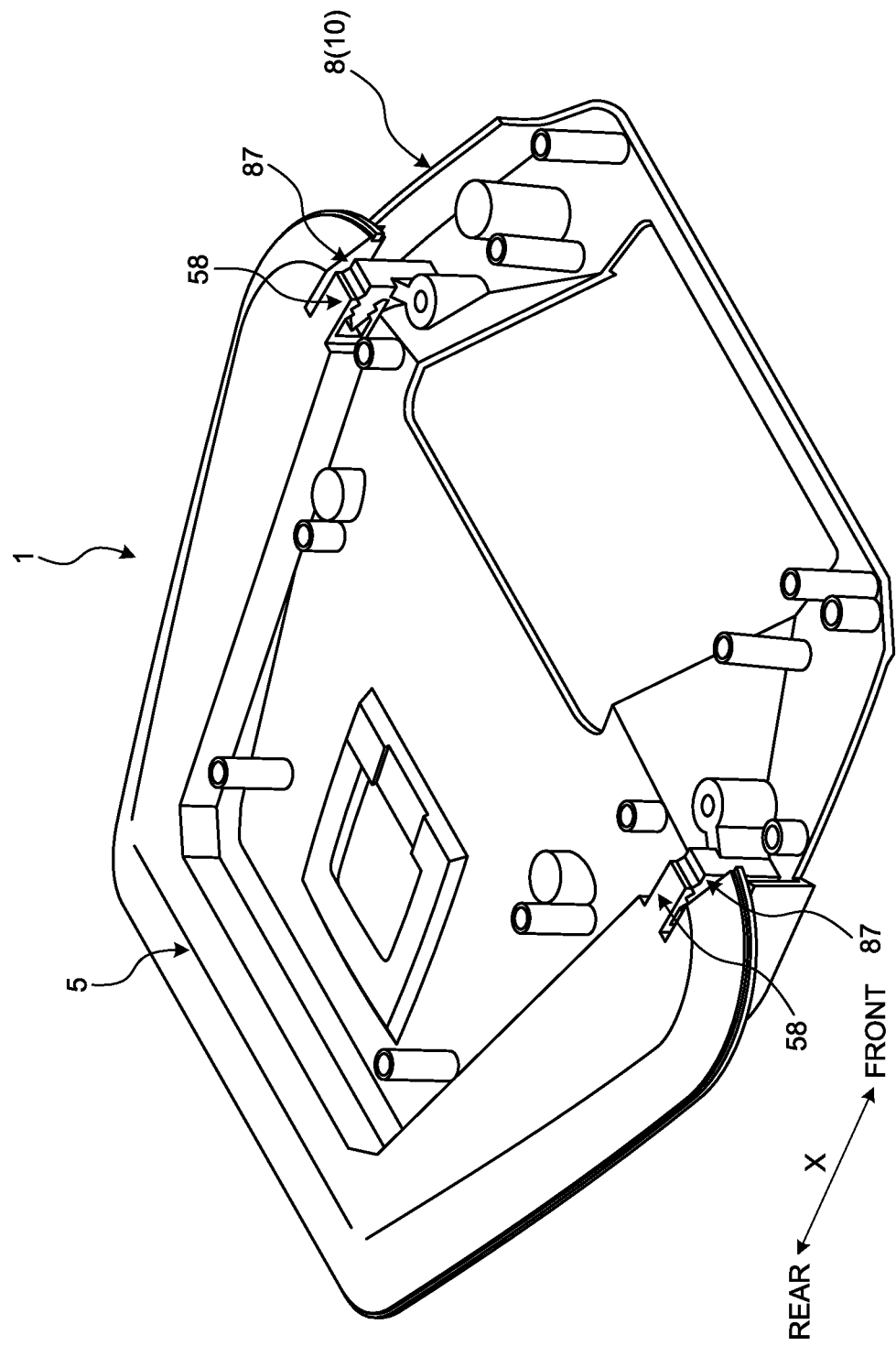
FIG. 13 is a perspective view illustrating the internal configuration of the roof module according to a first modification example of the embodiment.
Figure 14:
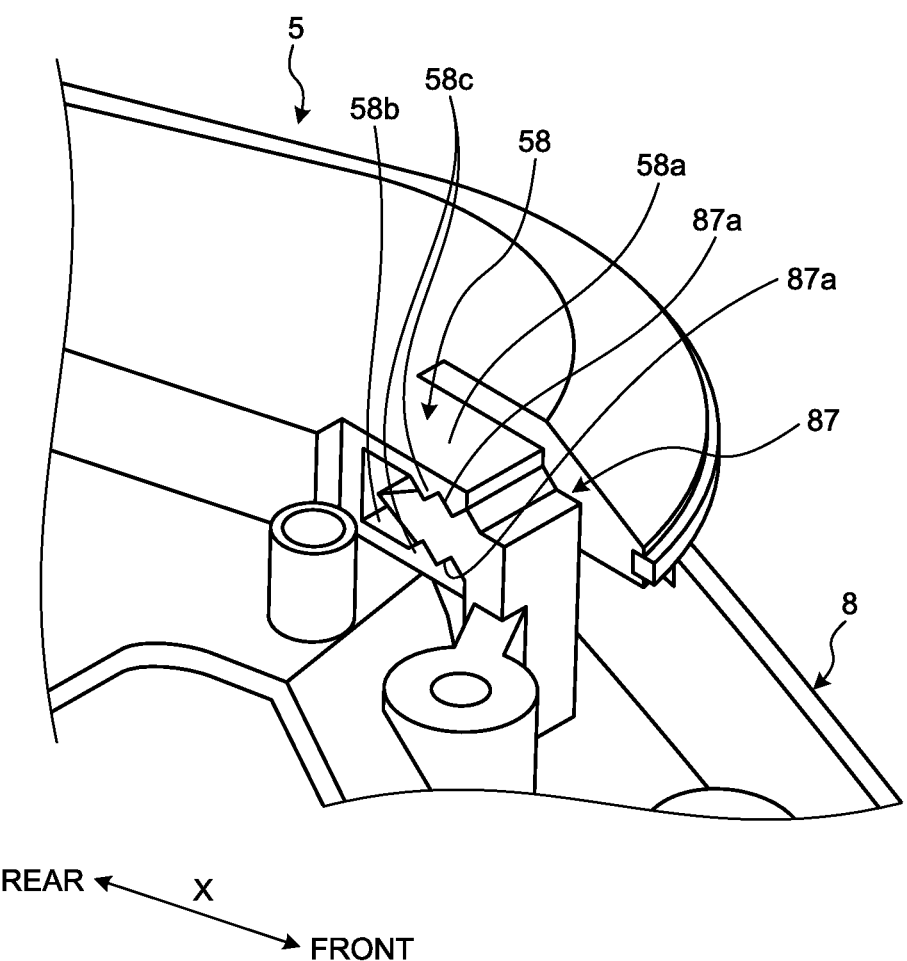
FIG. 14 is a perspective view illustrating the main part of the roof module according to the first modification example of the embodiment.
Figure 15:
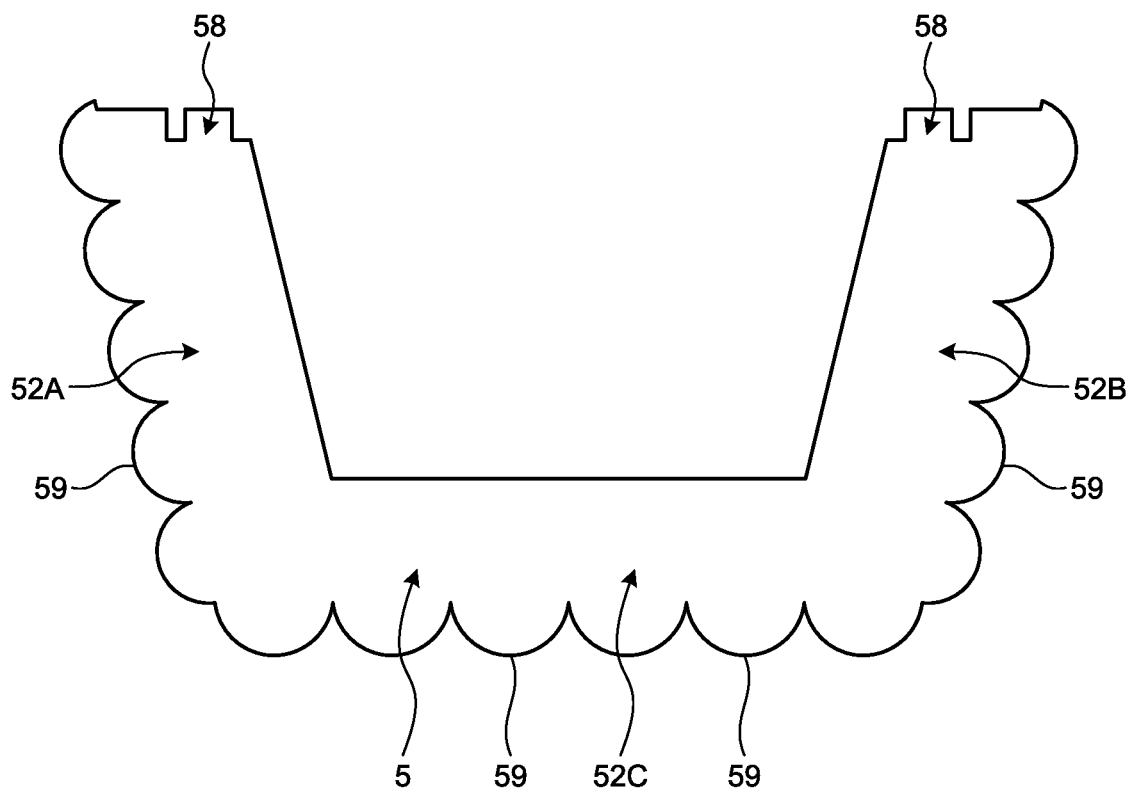
FIG. 15 is a plan view illustrating an example of a light guide member.

A first modification example of the embodiment will be described with reference to FIGS. 13 to 15. FIG. 13 is a perspective view illustrating the internal configuration of the roof module according to the first modification example of the embodiment. FIG. 14 is a perspective view illustrating the main part of the roof module according to the first modification example of the embodiment. FIG. 15 is a plan view illustrating an example of the light guide member.

As illustrated in FIGS. 13 and 14, the light guide member 5 according to the first modification example of the embodiment is detachable with respect to the housing 10. The light guide member 5 is attached to or removed from the housing 10 while sliding along the vehicle front-rear direction X. The light guide member 5 of the present modification example has an engagement portion 58. The cover portion 8 of the present modification example has an engagement portion 87 corresponding to the engagement portion 58.

As illustrated in FIG. 14, the engagement portion 58 of the light guide member 5 has a first piece portion 58a and a second piece portion 58b. The first piece portion 58a and the second piece portion 58b are plate-shaped components protruding from the front end of the light guide member 5 toward the front of the vehicle. The first piece portion 58a and the second piece portion 58b face each other. A projection 58c is formed on the surfaces of the first piece portion 58a and the second piece portion 58b that face each other. The projection 58c extends along the direction that is orthogonal to the vehicle front-rear direction X. The cross-sectional shape of the projection 58c is, for example, triangular.

The engagement portion 87 of the cover portion 8 is a piece portion protruding toward the rear of the vehicle. A projection 87a is formed on both surfaces of the engagement portion 87. The projection 87a extends along the direction that is orthogonal to the vehicle front-rear direction X. The cross-sectional shape of the projection 87a is, for example, triangular.

In a case where the light guide member 5 is attached to the housing 10, the light guide member 5 is inserted into the cover portion 8. The light guide member 5 is slid toward the front of the vehicle starting from the engagement portion 58. In this case, the engagement portion 87 is inserted between the first piece portion 58a and the second piece portion 58b.

The first piece portion 58a and the second piece portion 58b receive the engagement portion 87 while being bent and deformed. The projection 87a of the engagement portion 87 meshes with the projection 58c of the light guide member 5 and is locked by the projection 58c. As a result, the light guide member 5 is fixed to the housing 10. The housing 10 may have a guide portion guiding the light guide member 5 along the vehicle front-rear direction X.

In a case where the light guide member 5 is removed from the housing 10, the light guide member 5 is slid toward the rear of the vehicle. The engagement portion 87 is pulled out to the rear of the vehicle beyond the engagement portion 58 while bending and deforming the first piece portion 58a and the second piece portion 58b. As a result, the light guide member 5 is pulled out from the housing 10.

By the light guide member 5 and the housing 10 having the detachable engagement portions 58 and 87 as described above, the design and the lighting function of the roof module 1 are customized with ease. A user can change the color and the shape of the light guide member 5 to a favorite color and a favorite shape by replacing the light guide member 5. For example, the light guide member 5 that is illustrated in FIG. 15 may be attached to the housing 10. The light guide member 5 illustrated in FIG. 15 has a plurality of protruding portions 59. The protruding portions 59 are formed side by side at the tip of the light guide member 5 in the direction of protrusion.

The mechanism that fixes the light guide member 5 to the housing 10 is not limited to the exemplified clip structure. For example, the light guide member 5 may be fixed to the housing 10 by a fastening member such as a screw.

Second Modification Example of Embodiment

Figure 16:
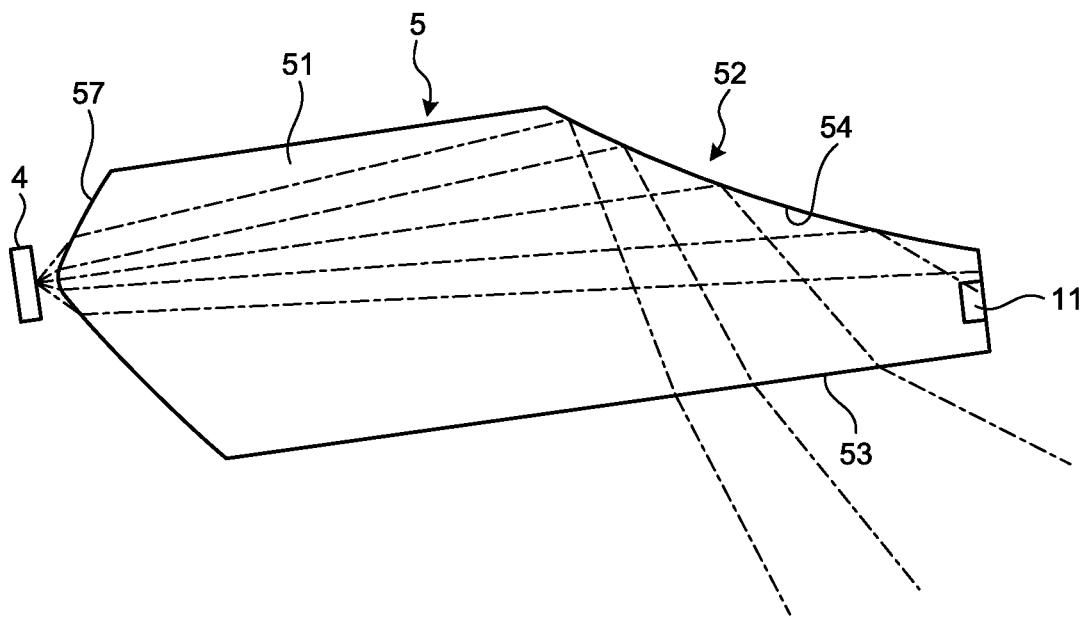
FIG. 16 is a cross-sectional view of the light guide member according to a second modification example of the embodiment.

A second modification example of the embodiment will be described. FIG. 16 is a cross-sectional view of the light guide member according to the second modification example of the embodiment. In the light guide member 5 according to the second modification example of the embodiment, a light incident surface 57 has a condensing shape. The light incident surface 57 is a surface on which the light from the first light source 4 is incident. The light incident surface 57 has the condensing shape allowing the light incident on the light incident surface 57 to be condensed toward the reflecting portion 54. The condensing shape is, for example, a curved shape convex toward the first light source 4. The cross-sectional shape of the light incident surface 57 is, for example, a shape in which the most convex portion of the curved shape is positioned on the optical axis of the first light source 4. Light leakage from a place other than the diffusion portion 53 is suppressed by the light being condensed toward the reflecting portion 54 by the light incident surface 57.

The shape of the light guide member 5 is not limited to the exemplified shape. For example, the light guide member 5 may be L-shaped, O-shaped, and so on in plan view. The light incident surfaces 51a, 51b, 51c, 51d, and 51e of the light guide member 5 may have a condensing shape allowing incident light to be condensed toward the reflecting portions 54 and 55.

The content disclosed in the above embodiment and modification examples can be implemented in combination as appropriate.

A vehicular interior lighting device according to the embodiment includes a main body portion fixed to an inside surface as a surface of a roof of a vehicle on a cabin side, a first light source and a second light source accommodated in the main body portion, a light shielding cover portion constituting a housing with the main body portion and covering the first light source and the second light source from below, a light guide member having a protruding portion protruding toward a direction along the inside surface from a gap between the main body portion and the cover portion and guiding light emitted from the first light source and the second light source to a cabin, and a condensing lens disposed between the second light source and the light guide member.

The light guide member has a diffusion portion formed on a surface of the protruding portion facing downward and diffusing light and a reflecting portion reflecting light emitted from the second light source and incident on the light guide member via the condensing lens toward a part of the diffusion portion. The diffusion portion of the light guide member emits light in whole by light emitted from the first light source and a part of the diffusion portion emits light by light emitted from the second light source. In the vehicular interior lighting device according to the embodiment, the diffusion portion protruding to the outside of the housing partially emits light by means of the light of the second light source accommodated in the housing and covered by the light shielding cover portion. As a result, novel lighting providing a feeling of floating is realized as an effect.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular interior lighting device comprising:
    a main body portion fixed to an inside surface, the inside surface being a cabin side surface of a roof of a vehicle;
    a first light source and a second light source accommodated in the main body portion;
    a light shielding cover portion constituting a housing with the main body portion and covering the first light source and the second light source from below;
    a light guide member having a protruding portion protruding toward a direction along the inside surface from a gap between the main body portion and the cover portion and guiding light emitted from the first light source and the second light source to a cabin; and
    a condensing lens disposed between the second light source and the light guide member, wherein
    the light guide member has a diffusion portion formed on a surface of the protruding portion facing downward and diffusing light and a reflecting portion reflecting light emitted from the second light source and incident on the light guide member via the condensing lens toward a part of the diffusion portion, and
    the diffusion portion of the light guide member emits light in whole by light emitted from the first light source and a part of the diffusion portion emits light by light emitted from the second light source.

2. The vehicular interior lighting device according to claim 1, wherein
    the protruding portion has a first protruding portion protruding toward one side in a vehicle width direction, a second protruding portion protruding toward another side in a vehicle width direction, and a third protruding portion protruding toward a rear of a vehicle, and
    light emitted from the second light source causes an intersection of the first protruding portion and the third protruding portion in the diffusion portion and an intersection of the second protruding portion and the third protruding portion in the diffusion portion to emit light.

3. The vehicular interior lighting device according to claim 1, wherein
    a circular region in the diffusion portion emits light by light emitted from the second light source.

4. The vehicular interior lighting device according to claim 2, wherein
    a circular region in the diffusion portion emits light by light emitted from the second light source.

5. A roof module comprising:
    a main body portion fixed to an inside surface, the inside surface being a cabin side surface of a roof of a vehicle;
    a first light source and a second light source accommodated in the main body portion;
    a light shielding cover portion constituting a housing with the main body portion, having a concave portion concave upward, and covering the first light source and the second light source from below;
    a light guide member having a protruding portion protruding toward a direction along the inside surface from a gap between the main body portion and the cover portion and guiding light emitted from the first light source and the second light source to a cabin;
    a condensing lens disposed between the second light source and the light guide member; and
    a display device disposed in the concave portion and having a display surface directed to a rear of a vehicle, wherein
    the light guide member has a diffusion portion formed on a surface of the protruding portion facing downward and diffusing light and a reflecting portion reflecting light emitted from the second light source and incident on the light guide member via the condensing lens toward a part of the diffusion portion, and
    the diffusion portion of the light guide member emits light in whole by light emitted from the first light source and a part of the diffusion portion emits light by light emitted from the second light source.

* * * * *